(12) United States Patent
Litke et al.

(10) Patent No.: US 7,576,738 B2
(45) Date of Patent: Aug. 18, 2009

(54) METHOD FOR CONSTRUCTING SURFACE PARAMETERIZATIONS

(75) Inventors: Nathan J. Litke, San Francisco, CA (US); Martin Rumpf, Bonn (DE)

(73) Assignee: California Institute of Technology, Pasadena, CA (US)

( * ) Notice: Subject to any disclaimer, the term of this patent is extended or adjusted under 35 U.S.C. 154(b) by 500 days.

(21) Appl. No.: 11/442,816

(22) Filed: May 30, 2006

(65) Prior Publication Data

US 2006/0267978 A1 Nov. 30, 2006

Related U.S. Application Data

(60) Provisional application No. 60/685,282, filed on May 27, 2005.

(51) Int. Cl.
*G06T 15/00* (2006.01)

(52) U.S. Cl. .............. 345/420; 345/441; 345/428; 345/584; 382/115; 382/125; 703/2; 703/6

(58) Field of Classification Search .......... 345/420, 345/428, 584, 619, 426, 441; 382/115, 125, 382/199; 703/2, 6
See application file for complete search history.

(56) References Cited

U.S. PATENT DOCUMENTS

| 5,988,862 | A * | 11/1999 | Kacyra et al. | 703/6 |
| 6,256,039 | B1 * | 7/2001 | Krishnamurthy | 345/420 |
| 6,850,233 | B2 * | 2/2005 | Hoppe et al. | 345/420 |
| 7,262,769 | B2 * | 8/2007 | Hoppe et al. | 345/420 |
| 7,365,744 | B2 * | 4/2008 | Fang et al. | 345/423 |
| 7,453,456 | B2 * | 11/2008 | Petrov et al. | 345/419 |

OTHER PUBLICATIONS

Allen, B., et al., The space of human body shapes: reconstruction and parameterization from range scans. ACM Transactions on Graphics 22, 3 (Jul. 2003), pp. 587-594.
Alvarez, B., et al., A scale-space approach to nonlocal optical flow calculations. In Second International Conference, Scale-Space '99 (1999), Lecture Notes in Computer Science; 1682, pp. 235-246.
Bajcsy, R. et al., Matching of deformed images. In Proc. 6th Int. Joint Conf. Pattern Recogn. (1982), pp. 351-353.
Ball, J.M., Convexity conditions and existence theorems in nonlinear elasticity. Arch. Rat. Mech. Anal. 63 (1977), pp. 337-403.
Blanz, V. et al., A morphable model for the synthesis of 3D faces. In Proceedings of SIGGRAPH 99 (1999), Computer Graphics Proceedings, Annual Conference Series, pp. 187-194.

(Continued)

*Primary Examiner*—Phu K Nguyen
(74) *Attorney, Agent, or Firm*—Gates & Cooper LLP

(57) ABSTRACT

A method, apparatus, and article of manufacture provide the ability to construct an optimal parameterization for a discrete surface patch. A three-dimensional image having a surface is selected. An initial parameterization of the surface onto a two-dimensional plane is constructed. A distortion of the initial parameterization is measured. A length parameter, an area parameter, and an angle parameter are specified. The initial parameterization is then optimized through a discrete deformation of a parameter domain that minimizes the distortion based on the length, area, and angle parameter.

21 Claims, 17 Drawing Sheets
(14 of 17 Drawing Sheet(s) Filed in Color)

OTHER PUBLICATIONS

Bornemann, F., et al., Finite-element discretization of static Hamilton-Jacobi equations based on a local variational principle. Preprint, 2005.

Brown, L.G., A survey of image registration techniques. ACM Computing Surveys 24, 4 (Dec. 1992), pp. 325-376.

Cheng, X., On the nonlinear inexact Uzawa algorithm for saddle-point problems. SIAM J. Numer. Anal. 37, 6 (2000), pp. 1930-1934.

Clarenz, U., et al., Axioms and variational problems in surface parameterization. Computer Aided Geometric Design 21, 8 (2004), 727-749.

Dacorogna, B. et al., On a partial differential equation involving the Jacobian determinant. Ann. Inst. H. Poincar'e Anal. Non Lin'eaire 7, 1 (1990), pp. 1-26.

Desbrun, M. et al., Implicit fairing of irregular meshes using diffusion and curvature flow. In Proceedings of SIGGRAPH 99 (Aug. 1999), Computer Graphics Proceedings, Annual Conference Series, pp. 317-324.

Droske, M. et al., A variational approach to non-rigid morphological image registration. SIAM J. Appl. Math. 64, 2 (2004), pp. 668-687.

Floater, M. et al., Surface parameterization: a tutorial and survey. In Advances in Multiresolution for Geometric Modelling. Springer, 2005, pp. 157-186.

Grenander, U. et al., Computational anatomy: an emerging discipline. Quarterly Appl. Math. LVI, 4 (1998), pp. 617-694.

Grinspun, E. et al., Discrete shells. In 2003 ACM SIGGRAPH/ Eurographics Symposium on Computer Animation (Aug. 2003), pp. 62-67.

Gu, X. et al., Computing conformal structures of surfaces. Communications in Informations and Systems, Dec. 2002, pp. 121-146., vol. 2, No. 2.

Gu, X. et al., Matching 3D shapes using 2D conformal representations. In MICCAI (1) (2004), pp. 771-780.

Kraevoy, V. et al., Cross-parameterization and compatible remeshing of 3D models. ACM Transactions on Graphics 23, 3 (Aug. 2004), pp. 861-869.

Lee, A., et al., Multiresolution mesh morphing. In Proceedings of SIGGRAPH 99 (Aug. 1999), Computer Graphics Proceedings, Annual Conference Series, pp. 343-350.

Levy, B., et al., Least squares conformal maps for automatic texture atlas generation. ACM Transactions on Graphics 21, 3 (2002), pp. 362-371.

Litke, Nathan, et al., An Image Processing Approach to Surface Matching. Eurographics Symposium on Geometry Processing 2005.

Mercat, C., Discrete Riemann surfaces and the Ising model. Communications in Mathematical Physics 218,1 (2001), pp. 177-216.

Morrey, C., Quasi-convexity and lower semicontinuity of multiple integrals. Pac. J. Math. 2 (1952), pp. 25-53.

Moser, J., On the volume elements on a manifold. Trans. Amer. Math. Soc. 120 (1965), pp. 286-294.

Osher, S.J. et al., Fronts propagating with curvature dependent speed: Algorithms based on Hamilton-Jacobi formulations. J. of Comp. Physics 79 (1988), 12-49.

Parke, F. I., Computer generated animation of faces. In ACM'72: Proceedings of the ACM annual conference (1972), pp. 451-457.

Praun, E., et al., Consistent mesh parameterizations. In proceedings of ACM SIGGRAPH 2001 (Aug. 2001), Computer Graphics Proceedings, Annual Conference Series, pp. 179-184.

Sander, P. V., et al., Texture mapping progressive meshes. Proceedings of SIGGRAPH 2001 (2001), pp. 409-416.

Schreiner, J. et al., Inter-surface mapping. ACM Transactions on Graphics 23, 3 (Aug. 2004), pp. 870-877.

Sorkine, O, et al., Bounded-distortion piecewise mesh parameterization. In IEEE Visualization (2002), pp. 355-362.

Van Den Elsen, P. A., et al., Medical image matching: A review with classification. IEEE Engineering in Medicine and Biology 12 (Mar. 1993), pp. 26-39.

Gu, X. et al. (2002) ACM Transactions on Graphics 21, 3: 355-361.

Zhang, L. et al. (2004) ACM Transactions on Graphics 23, 3: 548-558.

\* cited by examiner

// Find an optimal deformation $\bar{\phi}$ that minimizes $E[\cdot]$
$\phi_0 \leftarrow 0, i \leftarrow 0$
repeat
    // Choose a search direction and step size
    compute the search direction $\psi_i$
    calculate the step size $\tau_i$
    if $\|\tau_i \psi_i\|_2 < \varepsilon$ then $\bar{\phi} \leftarrow \phi_i$ and stop // Update the deformation
    $\phi_{i+1} \leftarrow \phi_i + \tau_i \psi_i$
    $i \leftarrow i + 1$

FIG. 5

// Choose $\tau_i > 0$, $\rho, c \in (0,1)$
repeat until $E[\phi_i + \tau_i \psi_i] \leq E[\phi_i] + c\tau_i \nabla E[\phi_i]^T \psi_i$
    $\tau_i \leftarrow \rho \tau_i$

FIG. 6

```
// Build the image pyramid
for k = m downto 0 do
    filter images at level k using σ_k // Optimize φ^k from coarse to fine scales
φ^0 ← 0
for k = 0 to m do
    minimize E^{σ_k} starting with φ^k
    if k < m then prolongate φ^k to φ^{k+1}
```

METHOD FOR CONSTRUCTING SURFACE PARAMETERIZATIONS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/685,282, filed on May 27, 2005, by Nathan Litke and Martin Rumpf, entitled "METHODS FOR CONSTRUCTING SURFACE PARAMETERIZATIONS,".

STATEMENT REGARDING FEDERALLY SPONSORED RESEARCH AND DEVELOPMENT

The invention was made with Government support by the National Science Foundation under Grant Nos. DMS-0220905 and ACI 0219979 DOE—Chicago—Grant No. W-7405-ENG-48 Subcontract No. B341492. The Government has certain rights in this invention.

BACKGROUND OF THE INVENTION

1. Field of the Invention

The present invention relates generally to surface parameterizations, and in particular, to a method, apparatus, and article of manufacture for matching surfaces.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

The body of relevant literature is quite broad due to the wide span of fields in which parameterizations are studied. Most relevant to our treatment of parameterizations on triangulated surfaces is the graphics literature. In the context of correspondences between surfaces, work in image matching may be reviewed. In particular the non-linear approaches that deal directly with the large deformation setting. Relevant work from the graphics literature covers approaches which pursue direct mappings between surfaces in $\mathbb{R}^3$.

Parameterization

The most desirable property to achieve in a parameterization is isometry. This implies intuitively that all of the properties of the surface are represented in the corresponding parameter domain.

Strictly speaking, a map between two surfaces is an isometry if their first fundamental forms coincide. It is well known that isometric parameterizations exist only if the surface itself is locally flat, i.e. developable. A broad variety of algorithms have been proposed to construct such parameterizations for embedded triangle meshes (for a recent survey see the comprehensive overview by Floater and Hormann [19]). Generically these algorithms are distinguished by the way they measure distortion.

Distortion is a measurement of change in the first fundamental form of the mapping between the surface and the parameter domain, i.e., how much the metric induced by the parameterization deviates from the identity. There are many possible ways to measure deviation from the identity.

For example, Sander et al. consider the minimization of a variety of norms ($l^2$, $l^\infty$) of the singular values of the Jacobian [44], while Hormann and Greiner minimize the condition number of the Jacobian [25]. Degener et al. extend this work by adding a term that penalizes area distortion [14].

The maximum eigenvalue of the Jacobian and its inverse were used by Sorkine et al. [47]. These approaches all involve difficult algorithms and it is unclear what guarantees can be made of the resulting parameterizations.

Other free-boundary methods are primarily concerned with controlling angle distortion. On one hand we find methods which attempt to construct conformal parameterizations directly. These include the minimization of harmonic energy with natural boundary conditions [15], which turns out to be equivalent to a least-squares optimal discrete approximation of conformal parameterizations [29]. The case of closed, arbitrary genus surfaces (possibly after constructing a double cover) was treated by Gu and Yau [24] based on discrete Riemann surface theory [33]. Direct minimization of the change of angle was pursued by Sheffer and de Sturler [46], who used a highly non-linear minimization procedure. Kharevych et al. approached discrete conformal parameterizations by deriving a convex energy based on the intersection angles of circles on the surface triangulation [26]. In this class of methods the focus is entirely on controlling angle distortion, with the exception of Desbrun et al. who also define a separate authalic energy to control the change of area (although only in the presence of Dirichlet boundary conditions).

In all of these approaches, the interaction between area, angle and length distortion is not easily controlled or well understood from a mathematical perspective, e.g., little is known about the existence of solutions. With the exception of methods based on harmonic or conformal maps [15, 24, 26, 29], most of the previous work is formulated in the discrete setting of surface triangulations where these results are unknown.

Image Matching

In image processing, registration is often approached as a variational problem. One asks for a deformation that maps structures in the reference image A onto corresponding structures in the template image B on some image domain ω. In the case of unimodal images with a direct correspondence of the image intensities $I_A$ and $I_B$, the energy $\int_\omega (I_B(\xi)-I_A(\phi(\xi)))^2 \, d\xi$ measures the least-squares error of the match. We extend this idea to surface matching through a bending energy that measures the matching defect with respect to curvatures. It is well established that the associated minimization problem is ill-posed if one considers the infinite dimensional space of deformations [7, 48]. This is generally addressed by choosing a suitable regularization. Motivated by models from continuum mechanics, one may ask for a deformation that is additionally controlled by elastic stresses on images regarded as elastic sheets. For example see the early work of Bajcsy and Broit [3] and significant extensions by Grenander and Miller [20]. In the present invention relating to surface matching, we consider surfaces as thin shells. Besides the bending which we mentioned, surface deformations also lead to tangential stretching and shearing, which gives a real physical interpretation to the elastic stresses that are treated as a regularization in the resulting model. In particular, if large displacements are necessary to ensure a proper match, a regularization based on non-linear elasticity with its built-in control of length, area and volume changes is indispensible. Cohen [11] considered polyconvex elastic functionals and Droske and Rumpf [18] used this type of regularization to guarantee global injectivity and well-posedness. Such concepts may be used to avoid folding in our surface matches. In essence, non-rigid image matching is a powerful tool that may be used for surface matching.

3D Registration and Correspondence

Motivated by the ability to scan geometry with high fidelity, a number of approaches have been developed in the graphics literature to bring such scans into correspondence. Early work used parameterizations of the meshes over a common parameter domain to establish a direct correspondence between them [28]. Typically these methods are driven by user-supplied feature correspondences which are then used to drive a mutual parameterization. The main difficulty is the management of the proper alignment of selected features during the parameterization process [27, 43, 45] and the algorithmic issues associated with the management of irregular meshes and their effective overlay.

Special methods have been developed for situations in which a large number of scans of similar objects, albeit with great geometric variety, are to be brought into correspondence, for example for purposes of statistical analysis. These are typically geared towards establishing a correspondence against a template model. Blanz and Vetter [5] used cylindrical scans resulting in height "images" which were matched through a modified optical flow. Allen et al. [1] fit a high resolution template mesh to scans of the human body. They computed non-rigid deformations for the template by minimizing an error functional which performs well in the presence of holes and poorly sampled data, provided that the two surfaces are in similar poses. Such template-based approaches can also be very helpful during the acquisition itself. Zhang et al. [50] present a method for meshing dynamic range data using a surface fitting approach. In their method, a template mesh is fitted to a registered stereo pair of depth maps and the fitting is achieved by minimizing a depth matching energy and a regularization energy. Recently, Gu and Vemuri [23] considered matches of topological spheres through conformal maps with applications to brain matching. Their energy measures the defect of the conformal factor and—similar to the approach of the invention—the defect of the mean curvature. However they do not measure the correspondence of feature sets or tangential distortion, and thus do not involve a regularization energy for the ill-posed energy minimization. Furthermore, they seek a one-to-one correspondence, whereas the present invention must address the difficult problem of partial correspondences between surfaces with boundaries.

SUMMARY OF THE INVENTION

A surface parameterization is a function that maps coordinates in a 2-dimensional parameter space to points on a surface. The invention provides two kinds of parameterizations for surfaces that are disc-like in shape. The first is a map from a region of the plane to the surface. The second is a mapping from one surface to another, which defines a correspondence between them. The main challenge in both cases is the construction of a smooth map with low distortion. The invention presents a variational approach to surface parameterization that addresses these challenges.

The first contribution of the invention is the development of a variational framework for parameterizations. This framework encompasses the mapping of a region of the plane to a surface that is isomorphic to a disc, and the mapping between such surfaces. It may be based on the rich mathematical theory built up over decades in the study of rational mechanics. Because of its roots in mechanics, our parameterizations are guaranteed to be smooth and locally bijective, and optimal parameterizations which minimize a variational energy are known to exist. A proof of existence is given for the case of optimal parameterizations in the plane.

Our second contribution is a set of algorithms to construct parameterizations for surface triangulations. We describe in detail free-boundary methods that use standard numerical optimization algorithms for the computation of optimal parameterizations. A flexible set of parameters is offered to the user to formulate preferences for the trade-off between angle, area and length distortion in parameterizations in the plane. In the specification of a correspondence between surfaces, we provide user control through feature lines that are mapped as sets onto corresponding feature lines. Additionally we allow for a partial correspondence of the surfaces which is particularly important for correlating surfaces with boundaries.

Our third contribution is an analysis of the performance of the algorithms based on our implementations. Our testing focuses on parameterizations of physically-acquired triangle mesh data. The efficiency of our methods is measured by analyzing the rate of convergence of the energy minimization, and execution times are shown to be quite reasonable. Robustness is established in the presence of large deformations in the parameterizations and the stability of our parameterizations is demonstrated under different discretizations of the surfaces.

Our fourth contribution is a set of concrete, compelling applications of surface parameterization. Non-trivial examples which draw from texture mapping, morphing and facial animation provide further evidence and insight into the versatility of our parameterization framework.

Parametric surfaces have a long and illustrious history in the fields of computer graphics, computer-aided geometric design and engineering. Their success is largely due to the ease in which they represent the physical, analytic and visual properties of surfaces in space, i.e., the boundaries of three-dimensional shapes, which makes them amenable to simulation, manufacturing and visualization applications. Early boundary representations were built from piecewise-smooth parametric patches, which provide flexibility in design but have practical limitations in the level of detail that they can model. The advent of laser range scan technology in the last decade has provided the world with high-resolution models of physical objects with millions to billions of sample points. However, the triangulated surfaces generated from this data have no inherent parameterization, and thus parameterizing these surfaces has been an active area of research in recent years.

The invention provides parameterizations of surface triangulations in two contexts. The first context considers parameterizations that are defined as mappings from a disc-like region of the plane to the embedded surface. We present a rigorous variational framework for the construction of low-distortion parameterizations with free boundaries, based on the rich mathematical theory built up over decades in the study of rational mechanics. With a view toward the theory of elasticity, we treat the parameterization problem as one of finding an optimal deformation of an initial parameter domain in the plane. Starting with some basic axioms in the continuous setting, we derive a deformation energy that provides combined control over angle, area and length distortion in a unified framework. Because of its roots in mechanics, our method comes with analytic guarantees: our parameterizations are smooth and locally bijective, and we provide proof of the existence of optimal parameterizations that minimize our energy.

Our continuous model of the parameterization problem lets us use straightforward finite element methods to discretize our energy. This in turn allows us to leverage the extensive and mature body of work in numerical optimization to construct optimal parameterizations using a free-boundary method that uses standard numerical optimization algorithms for the energy minimization, with well-known performance guarantees. The finite element approach allows us to retain analytic guarantees of smoothness and bijectivity for the discrete parameterizations. Furthermore we provide a proof of convergence to the continuous solution in the limit of triangle grid refinement. The performance of our parameterization algorithm is demonstrated on surfaces reconstructed from physical data measurements. This data is particularly difficult to process due to its geometric complexity and the high variability of the data samples. We use a range of energy parameters to highlight the flexibility and variety of parameterizations that one can achieve with our energy. The resulting parameterizations have very low angle, area and length distortion overall and the different distortion measurements reflect the trade-offs in the choice of parameters.

In the second context we describe a method to find a correspondence between two surfaces that are isomorphic to a disc. This correspondence can also be interpreted as a parameterization of a region of a surface over a manifold domain embedded in space. Our approach draws upon well developed methods in global image matching to correlate two surfaces via a non-rigid deformation in their parameter domains. To do so we map geometric characteristics into the parameter plane and modify the standard image matching energies to correctly account for the geometry of the surfaces. This decouples the discretization of the surface from the discretization of the matching deformation, and thus the level of detail in the correspondence mapping can be chosen independently of the resolution of the surface triangulation. We present a multi-resolution algorithm using regular image grids that allows us to overcome problems with robustness and computational efficiency seen in previous methods that pursue mappings between surfaces directly in the embedding space. User control over the match is given through feature lines that are mapped as sets onto corresponding feature lines, which provides the user with a wide variety of techniques to fine-tune the correspondence if desired. We allow for a partial correspondence of the surfaces, which is particularly important for matching surfaces of disc topology, especially in boundary regions. The existence and global injectivity of the matching deformations is guaranteed such that the resulting deformations are smooth and bijective.

BRIEF DESCRIPTION OF THE DRAWINGS

The file of this patent contains at least one drawing executed in color. Copies of this patent with color drawing(s) will be provided by the patent and Trademark Office upon request and payment of the necessary fee.

Referring now to the drawings in which like reference numbers represent corresponding parts throughout:

FIG. 5 illustrates pseudo-code for the optimization algorithm in accordance with one or more embodiments of the invention;

FIG. 6 illustrates pseudo-code for the step size control algorithm in accordance with one or more embodiments of the invention;

DETAILED DESCRIPTION OF THE PREFERRED EMBODIMENTS

Figure 1:
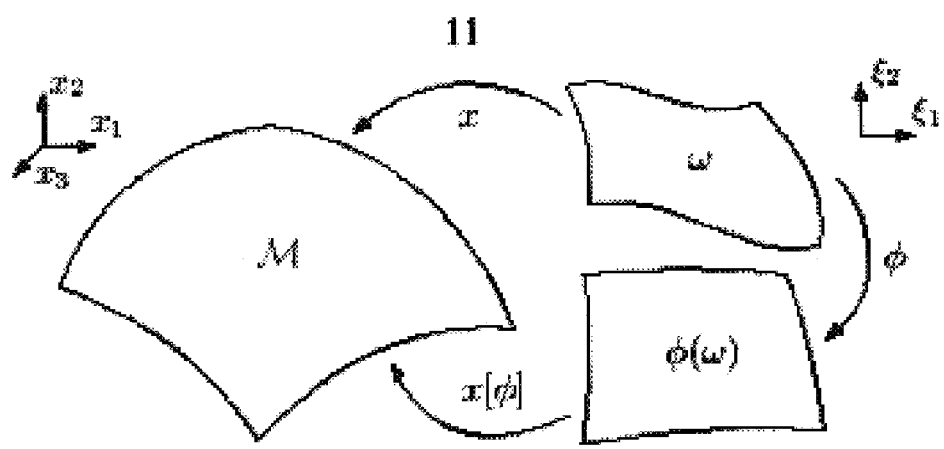
FIG. 1 illustrates a mapping from the parameter domain to the surface patch in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Contributions of the Invention

Some of the contributions of the invention documented in this document may be described in papers [10, 17, 30, 31].

The first contribution of the invention is the development of a variational framework for parameterizations. This framework encompasses the mapping of a region of the plane to a surface that is isomorphic to a disc, and the mapping between such surfaces. It is based on the rich mathematical theory built up over decades in the study of rational mechanics. Because of its roots in mechanics, our parameterizations are guaranteed to be smooth and locally bijective, and optimal parameterizations which minimize a variational energy are known to exist. A proof of existence is given in this document for the case of optimal parameterizations in the plane.

Our second contribution is a set of algorithms to construct parameterizations for surface triangulations. We describe in detail free-boundary methods that use standard numerical optimization algorithms for the computation of optimal parameterizations. A flexible set of parameters is offered to the user to formulate preferences for the trade-off between angle, area and length distortion in parameterizations in the plane. In the specification of a correspondence between surfaces, we provide user control through feature lines that are mapped as sets onto corresponding feature lines. Additionally we allow for a partial correspondence of the surfaces which is particularly important for correlating surfaces with boundaries.

Our third contribution is an analysis of the performance of the algorithms based on our implementations. Our testing focuses on parameterizations of physically-acquired triangle mesh data. The efficiency of our methods is measured by analyzing the rate of convergence of the energy minimization, and execution times are shown to be quite reasonable. Robustness is established in the presence of large deformations in the parameterizations and our parameterizations are stable under different discretizations of the surfaces.

Our fourth contribution is a set of concrete, compelling applications of surface parameterization. Non-trivial examples which draw from texture mapping, morphing and facial animation provide further evidence and insight into the versatility of our parameterization framework.

Overview

This document is organized as follows. The next section presents a variational framework for parameterization in two parts. The first of these, entitled surface parameterization, describes a variational approach to parameterizations in the plane. The second, surface matching, is concerned with the correspondence mapping between two surfaces. The derivations therein define the basic components of the parameterization energies with particular attention given to the geometric interpretation of the energy integrands.

The subsequent section describes the parameterization and matching algorithms in detail. Both procedures take user parameters that provide flexibility in the optimal parameterization, especially in the way it deals with distortion. The numerical optimization methods that perform the energy minimization are fully detailed to aid in implementation.

The performance and robustness of the algorithms are then analyzed through a series of tests using physically-acquired data. Subsequent sections describe a variety of compelling applications of surface parameterization. The description herein concludes with a summary of the contributions.

Variational Framework

This section develops the variational framework for surface parameterizations. We begin with parameterizations that map disc-like surfaces to the plane, and then turn our attention to mappings from one embedded surface to another. In the invention, we consider parameterizations as deformations of the surface. For parameterizations in the plane, this amounts to "flattening" the surface. For defining a correspondence between two surfaces, we think of deforming one surface to match the shape of the other. In fact both points of view are compatible, whereby a parameterization in the plane can be thought of as matching to a planar surface. From this perspective, our treatment of distortion falls within a general framework that separates tangential stress from stress due to bending of the surface normals. The latter is not considered for parameterizations in the plane because the curvature of the surface goes to zero everywhere under the parameterization deformation.

Surface Parameterization

The goal of surface parameterization is the construction of a smooth map with low distortion from a given surface patch to a region of the plane. Our approach starts with an initial parameterization from the embedded surface into $\mathbb{R}^2$ and then composes this map with another from $\mathbb{R}^2$ to itself. In doing so, we turn the problem of defining a parameterization into finding an optimal non-rigid deformation of the parameter domain. We develop a variational approach based on insights from rational mechanics that performs an energy relaxation over a set of non-rigid deformations in the plane. This gives us a unified framework for surface parameterization that incorporates the tradeoffs between different distortion measurements and provides clear mathematical statements as to the properties of this energy. In what follows, we develop this variational approach in the continuous setting, which we will later discretize to the space of surface triangulations.

Definition of a Parameterization

A parameterization is a mapping from the plane onto a given surface, or in the case of its inverse, from the surface onto the plane. Consider a smooth surface $M \subset \mathbb{R}^3$ and a parameterization $$x:\omega \to M$$

on a parameter domain $\omega \subset \mathbb{R}^2$. For a parameterization to be properly defined, its inverse $x^{-1}$ cannot allow the surface to fold onto itself in the plane. In this case x is locally bijective, and we say that the parameterization is admissible. A metric g is defined on $\omega$, $$g = Dx^T Dx$$

where $Dx \in \mathbb{R}^{3,2}$ is the Jacobian of the parameterization x. Roughly speaking, the metric g is a function which relates distances in the parameter domain $\omega$ to distances on the surface M. It acts on tangent vectors v, w on $\omega$ with $$(gv) \cdot w = Dxv \cdot Dxw$$

which is simply the inner product of tangent vectors Dxv, Dxw on M where products are given in matrix notation. It follows that the metric describes the distortion of an infinitesimal area of the domain under the parameterization function.

Measuring Distortion in a Parameterization

Let us now focus on the distortion from the surface M onto the parameter domain $\omega$ under the inverse parameterization $x^{-1}$. This distortion is measured by the inverse metric $g^{-1} \in \mathbb{R}^{2,2}$. Just as $\sqrt{tr(A^T A)}$ measures the average change of length under a linear mapping A, $\sqrt{tr(g^{-1})}$ measures the average change of length of tangent vectors under the mapping from the surface onto the parameter plane. Additionally, $\sqrt{det(g^{-1})}$ measures the corresponding change of area. In terms of the eigenvalues $\Gamma \geq \gamma$ of $g^{-1}$ we obtain $$a = tr(g^{-1}) = \Gamma + \gamma, \quad d = det(g^{-1}) = \Gamma\gamma.$$

The condition for a conformational parameterization is $\Gamma = \gamma$, and thus $$(\Gamma - \gamma)^{\frac{2}{d}} = \frac{\Gamma}{\gamma} + \frac{\gamma}{\Gamma} - 2 = \frac{a^2}{d} - 4$$

is a normalized, scale-invariant measure of the lack of conformality. The normalization is done so that a conformal mapping yields a value of zero for better numerical conditioning.

In what follows, we will use the quantities a, d and $a^2/d - 4$ to account for length, area and angle distortion, respectively. For an admissible parameterization we have $\Gamma, \gamma > 0$ everywhere and therefore a, d>0 and $a^2/d - 4 \geq 0$, i.e., our measures of distortion are strictly non-negative.

Measuring Distortion in a Deformation

In the invention, we suppose that a parameter map x of the surface patch M is defined in an initial step. We will assume that x and its parameter domain $\omega$ are fixed from now on. As mentioned above, we start with this fixed initial parameterization $x: \omega \to M$ and use an invertible Euclidean deformation $\phi: \omega \to \mathbb{R}^2$ to derive a new parameterization $$x[\phi] = x \circ \phi^{-1}$$

over the parameter domain $\omega[\phi] := \phi(\omega)$. For the inverse we obtain $x^{-1}[\phi] = \phi \circ x^{-1}$. Obviously, any smooth parameterization $\tilde{x}$ of the surface patch M can be written as $\tilde{x} = x[\phi]$ for $\phi := \tilde{x}^{-1} \circ x$. The complete mapping is illustrated in FIG. 1. In FIG. 1, the parameterization function $x[\phi] := x \circ \phi^{-1}$ is a mapping from the parameter domain $\omega[\phi] := \phi(\omega)$ to the surface patch M.

We will now study the distortion that arises from the deformation $\phi$. To motivate our definition of distortion, for the moment let us replace the surface patch M with a Euclidean domain $\Omega \subset \mathbb{R}^2$. A fundamental assumption from the theory of elasticity [9, 32] tells us that all distortion measures for a given deformation $\phi: \Omega \to \mathbb{R}^2$, such as length, area or angle distortion, can be expressed in terms of the deformation tensor $D\phi$. Thus measuring the distortion of a mapping is directly linked to measuring the elastic energy of the associated deformation. A fundamental result of rational mechanics states that the elastic stress induced in an isotropic elastic material by some deformation $\phi$ depends solely on the principal invariants of the Cauchy-Green strain tensor $C = D\phi D\phi^T$. In the case of deformations in $\mathbb{R}^2$, these invariants are the trace tr(C) and determinant det(C). In our setting, we replace the elastic body $\Omega \subset \mathbb{R}^2$ by our surface patch M and we consider parameterizations as elastic surface deformations to leverage these fundamental theorems from classical elasticity. The Cauchy-Green strain tensor we use here is defined by $$C[\phi] := D\phi g^{-1} D\phi^T$$

which generalizes the standard definition in that we obtain the classical Cauchy-Green tensor when M is flat (g=1I, the Euclidean metric). Note that $(C[\phi])^{-1}$ is the metric tensor $g[\phi]$ of the parameterization $x[\phi]$ induced by the deformation $\phi$. With this observation we can give a geometric interpretation of the elastic surface deformation. As in the case of the initial parameterization, $a = \sqrt{trC[\phi]} = \sqrt{tr(g^{-1}[\phi])}$ is a measure of length distortion under the mapping $\phi \circ x^{-1}$ and $d = \sqrt{detC[\phi]} = \sqrt{det(g^{-1}[\phi])}$ measures area distortion. Furthermore, $a^2/d - 4$ provides us with a measure of angle distortion. Thus $tr(C[\phi])$ and $det(C[\phi])$ are natural variables for an energy that measures the distortion in a parameterization.

A Variational Approach from First Principles

A theory for the deformation of elastic bodies has been developed over many decades, and is covered in many classical texts [9, 32, 39]. By approaching parameterizations from the context of classical elasticity, we obtain mathematical guarantees in the continuous setting which we will later extend to triangulated surfaces via a standard finite element discretization. We will now derive a parameterization energy from the first principles of elasticity, frame indifference, and isotropy, taking into account our geometric setting.

Elasticity: The energy depends solely on the distortion tensor $D(\phi \circ x^{-1})$. Therefore the total energy of a parameterization deformation $\phi$ and thus of the corresponding parameterization $x[\phi]$ is given by $$E[\phi] = \int_M W_M(D(\phi \circ x^{-1})(x))dA \qquad (2.1)$$

where $W_M: \mathbb{R}^{2,3} \to \mathbb{R}$ is an energy density which we will specify later.

Frame Indifference: The energy is independent of Euclidean motions $r(\xi) = R\xi + b$ of the parameter domain $\phi(\omega)$, where R∈SO(2) denotes a rotation and b∈$\mathbb{R}^2$ is a translation. Thus for any deformation $\phi:\omega \mathbb{R}^2$ we have $$W_M(RD(\phi \circ x^{-1})) = W_M(D(\phi \circ x^{-1})) \quad (2.2)$$

where $D(r \circ \phi \circ x^{-1}) = RD(\phi \circ x^{-1})$ by the chain rule.

Isotropy: The energy does not depend on directions on M. If u:M→M is any smooth mapping from M onto itself which is locally a rotation at some point x∈M, then the energy density at x is not affected by this transformation. Being "locally a rotation" here means that up to first order, the deformation is a rotation Q around x in the tangent space $T_xM$. Using the chain rule again (i.e., $D(\phi \circ x^{-1} \circ u) = D(\phi \circ x^{-1})Q$) we find $$W_M(D(\phi \circ x^{-1})Q) = W_M(D(\phi \circ x^{-1})) \quad (2.3)$$

for any rotation Q on $T_xM$.

From these first principles we are able to deduce a representation formula for the parameterization energy. Here we make use of two additional facts. Because the initial parameterization is fixed, we can integrate over the parameter domain in $\mathbb{R}^2$ instead of the embedded surface. It is then through the metric tensor $g \in \mathbb{R}^{2,2}$ that the initial parameterization from the region in $\mathbb{R}^2$ to the surface enters into our energy. Furthermore, since the elastic deformation is given as the minimizer of an elastic energy integrand, the energy density too must depend only on the principal invariants of $C[\phi]$ and not the full deformation tensor $D\phi \in \mathbb{R}^{2,2}$. This leads us to the following general form for our parameterization energy.

Theorem 2.1 (Representation of the energy) Let M be a smooth surface patch, which is parameterized by an initial parameterization x over a set $\omega \subset \mathbb{R}^2$. Under the assumptions of elasticity (2.1), frame indifference (2.2) and isotropy (2.3), there exists a function $W:\mathbb{R}^2 \to \mathbb{R}$ such that $W_M(D(\phi \circ x^{-1}))(x) = W(\iota_C[\phi])\sqrt{\det g}$ where $\iota_A = (\text{tr}(A), \det(A))$ are the two principal invariants of $A \in \mathbb{R}^{2,2}$ and the Cauchy-Green strain tensor is defined by $$C[\phi] = D\phi g^{-1} D\phi^T.$$

Furthermore, the expression $g \in \mathbb{R}^{2,2}$ is the metric tensor w.r.t. the parameterization x, i.e., $g = Dx^T Dx$. Thus, the parameterization energy can be written as $$E[\phi] = \int_\omega W(\text{tr}(C[\phi]), \det(C[\phi]))\sqrt{\det g} \, d\xi. \quad (2.4)$$

A proof of this theorem appears in the Appendix. The representation (2.4) has two significant practical advantages. First, we simplify the energy density W to a function of two variables, namely the principal invariants $\text{tr}(C[\phi]), \det(C[\phi])$, which reduces the computational overhead of treating the full deformation tensor $D\phi$ as a 4-dimensional variable. Second, by describing the new parameterization in terms of a deformation $\phi$ of the initial parameter domain $\omega$, we avoid a free-boundary problem which would involve complicated integrals on the boundary.

It comes as no surprise that the principal invariants of the distortion tensor $C[\phi]$ appear in our energy (2.4). Indeed, a number of earlier works have arrived at energies based on the principal invariants by using similar considerations in the discrete geometric setting. However as we shall see below, by deriving from these fundamental axioms of classical elasticity we are able to make concrete statements about its theoretical properties.

Minimal Energy Parameterizations

The previous theorem describes an energy that is supposed to capture the distortion of a parameterization as a function of the principal invariants of the Cauchy-Green strain tensor. As suggested above, our energy density should therefore be a function of $a = \text{tr}(C[\phi])$ (length control), $d = \det(C[\phi])$ (area control) and $a^2/d - 4$ (conformality control). Following Theorem 2.1, we propose to use the energy density $$W(a, d) = \alpha_l a + \alpha_a \left( d + \left( \frac{\alpha_l}{\alpha_a} + 1 \right) d^{-1} \right) + \alpha_c (a^2/d - 4) \quad (2.5)$$

The three terms control the preservation of length, area and conformality of the chart $x \circ \phi^{-1}$, and thus simultaneously capture all of our measures of distortion. Note that the second term controls both area expansion with d and area compression through $d^{-1}$. The parameters $\alpha_l, \alpha_a$ and $\alpha_c$ chosen by the user according to the relative importance of length, area and angle distortion in the parameterization. These parameters must satisfy certain conditions to guarantee that the parameterization problem is well-posed. We start with the requirement that an isometry is an $\alpha$-optimal parameterization, i.e., a parameterization which minimizes the energy defined by a given set of parameters $\alpha = (\alpha_l, \alpha_a, \alpha_c)$. We will refer to these simply as "optimal parameterizations" in what follows. Based on a Taylor expansion of the energy density (2.5) close to an isometry, we show in the Appendix that an isometry is at least a local minimizer of the energy if $$\alpha_l > 0, \alpha_a > 0, \alpha_c \geq 0 \quad (2.6)$$

A further analysis provides additional insight into these restrictions:

We require a non-zero length parameter $\alpha_l > 0$ to guarantee the existence of a minimal energy deformation. Without this restriction one will not have a bounded minimizing sequence in the space of deformations, e.g., without a penalty on length the energy is invariant under shearing deformations.

A non-zero area parameter $\alpha_a > 0$ is critical to ensure local injectivity, and is directly responsible for preventing folds in the discrete setting of triangulations. Control over area compression through $d^{-1}$ also prevents the parameterization from collapsing to a point in the domain, i.e., as occurs in linear elasticity without the presence of boundary constraints.

The balancing factor $$\left( \frac{\alpha_l}{\alpha_a} + 1 \right)$$

between area expansion and compression appears when one asks for a positive definite Hessian at an energy minimum, e.g., for the sake of applying standard algorithms in numerical optimization to find a minimizing deformation. Consequently, the direct control of length and area through $\alpha_l, \alpha_a > 0$ plays a crucial role in the proof of existence.

Existence of Optimal Parameterizations

Guaranteeing the existence of a solution is essential for a numerical algorithm to robustly generate a parameterization. Therefore we will now give a rigorous and fairly general statement on the existence of an optimal parameterization.

Theorem 2.2 (Existence of an Optimal Parameterization) Let M be a smooth surface patch, which is parameterized by an initial parameterization x over a set $\omega \subset \mathbb{R}^2$. Furthermore, consider the energy in (2.5) over a set of admissible deformations $\phi$ which are continuous and have $\det \phi > 0$. Then for parameters $\alpha_l$, $\alpha_a$, $\alpha_c$, which satisfy (2.6), there exists an admissible, minimizing deformation $\tilde{\phi}$.

We defer the proof to the Appendix. The theorem states that for any smooth surface patch M and initial parameterization x, there exists an optimal parameterization for any valid choice of parameters $\alpha$ satisfying (2.6). This parameterization is formulated by $x[\tilde{\phi}]=x\circ\tilde{\phi}^{-1}$, where $\tilde{\phi}$ is an admissible deformation that minimizes the energy (2.5). Furthermore, $\tilde{\phi}$ is in the set of admissible deformations, meaning that $\tilde{\phi}$ is continuous and locally bijective (i.e., $\det\tilde{\phi}>0$ everywhere). Since the initial parameterization x is required to be locally bijective, it follows that the optimal parameterization $x[\tilde{\phi}]:=x\circ\tilde{\phi}^{-1}$ is guaranteed to be free of folds in its parameter domain $\omega[\tilde{\phi}]:=\tilde{\phi}(\omega)$.

In certain applications, one is interested in obtaining an exactly area-preserving parameterization (i.e., $\Gamma\gamma=1$). This is summarized in the following statement.

Corollary 2.3 (Existence of an Optimal, Area-Preserving Parameterization) Under the assumptions of Theorem 2.2, and for the modified set of admissible deformations $\phi$ with $\det g^{-1}[\phi]=1$, there exists a minimizing deformation $\tilde{\phi}$.

The proof is given in the Appendix. The existence of such parameterizations is well known [13, 24, 37], and in this case there exist entire families of parameterizations. This additional degree of freedom can be exploited in the general energy (2.5) to optimize a secondary criterion while maintaining an exactly area-preserving parameterization.

Surface Matching

A correspondence between two surface patches, $M_A$ and $M_B$, can be regarded as a non-rigid spatial deformation $$\phi_M : M_A \to \mathbb{R}^3$$

such that corresponding regions of $M_A$ are mapped onto regions of $M_B$. Instead of formulating these maps directly in $\mathbb{R}^3$, we match geometric characteristics and user-defined features in the parameter domain. The main benefit of this approach is that it simplifies the problem of finding correspondences for surfaces embedded in $\mathbb{R}^3$ to a matching problem in two dimensions.

Our motivation comes from a variational approach for matching images through an energy relaxation over a set of non-rigid deformations in the plane [18, 20], where the optimal match is achieved by the mapping that minimizes a suitable energy. To ensure that the actual geometry of the surface patches is treated properly in the invention, the energy on the deformations from on parameter space to the other will measure:

Regularization Energy—smoothness of the deformation in terms of tangential distortion;

Bending Energy—bending of normals through the proper correspondence of curvature, and Feature Energy—the proper correspondence of important surface and texture features.

Furthermore, it will consistently take into account the proper metrics on the parameter domains, which ensures that we are actually treating a deformation from one surface onto the other even though all computations are performed in 2D.

A Physical Interpretation of the Matching Deformation

Figure 2:
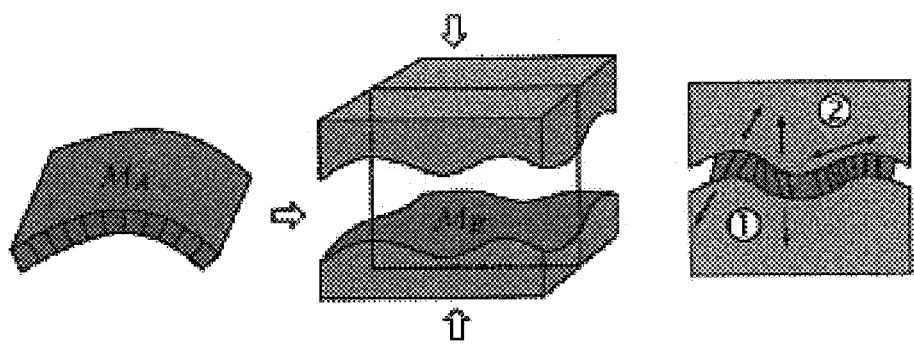
FIG. 2 provides a physical interpretation of $\phi_M$ as pressing a thin shell $M_A$ into a mould of the surface $M_B$ being matched in accordance with one or more embodiments of the invention.

Consider the first surface to be a thin shell which we press into a mould of the second surface (See FIG. 2). FIG. 2 provides a physical interpretation of $\phi_M$ as pressing a thin shell $M_A$ into a mould of the surface $M_B$ being matched. The bending (1) and stretching (2) of the thin shell is measured in our matching energy, and minimized by the optimal match $\phi_M$.

One can distinguish between stresses induced by stretching and compression, and stressed induced by bending that occurs in the surface as it is being pressed. Thus $\phi_M$ can be regarded as the deformation of such a thin shell. We assume this deformation to be elastic. The regularization energy in (2.7) will measure the induced in-plane stresses, and the concrete energy density in (2.8) allows control over length and area-distortion in this surface-to-surface deformation. Since we are aiming for a proper correspondence of shape, we will incorporate the bending of normals in our energy with (2.9). Finally, the matching of feature sets in (2.10) will provide user-specified landmarks to guide the surface deformation. In what follows, we will develop the variational approach step-by-step.

Measuring Distortion in a Deformation

The distortion in a parameterization was the subject of above descriptions, where it was shown that the distortion from the surface patch M onto the parameter domain $\omega$ under the inverse parameterization $x^{-1}$ is measured by the inverse metric $g^{-1}\in\mathbb{R}^{2,2}$. Specifically, $\sqrt{\text{tr}(g^{-1})}$ measures the average change of length of tangent vectors under the mapping from the surface onto the parameter plane. Additionally, $\sqrt{\det(g^{-1})}$ measures the corresponding change of area. We will use these quantities in the following sections to account for the distortion of length and area on the surface as we formulate our matching energy in the parameter domain.

The above discussion now applies to the parameter maps $x_A$ and $x_B$ of the surfaces $M_A$ and $M_B$. We suppose that these parameterizations are defined in an initial step and we assume that $x_A$ and $x_B$ as well as the corresponding parameter domains $\omega_A$ and $\omega_B$ are fixed from now on. Their metrics are denoted by $g_A$ and $g_B$, respectively.

Figure 3:
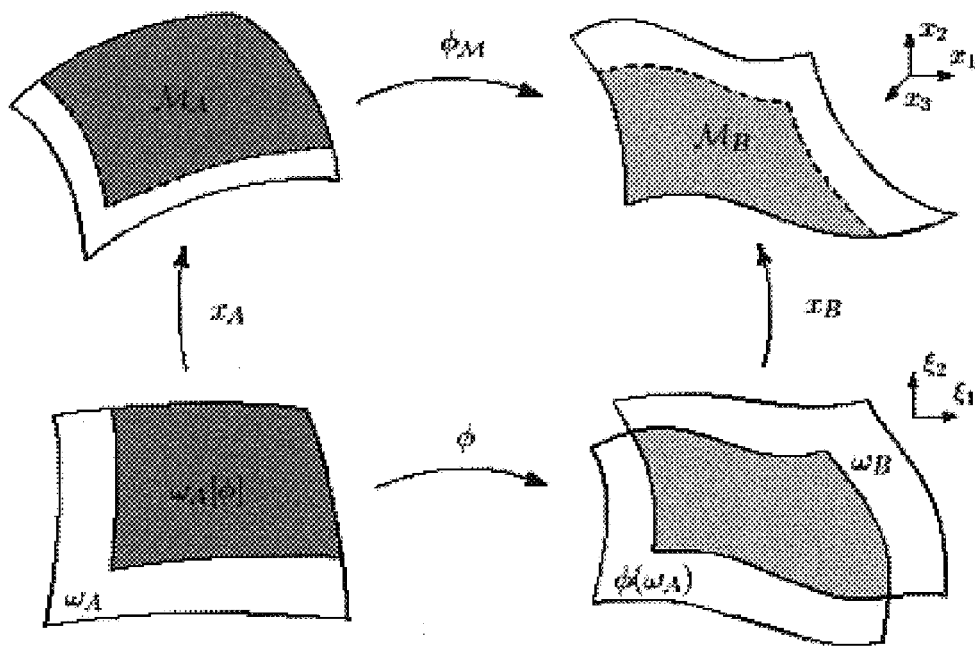
FIG. 3 illustrates a complete mapping between corresponding shaded regions of two surfaces in accordance with one or more embodiments of the invention.

We will now study the distortion which arises from a deformation of the first parameter domain onto the second parameter domain. First, let us consider deformations $\phi:\omega_A\to\omega_B$, which are one-to-one. This deformation between parameter domains $$\phi_M := x_B \circ \phi \circ x_A^{-1}.$$

induces a deformation between the surface patches $\phi_M : M_A \to M_B$ defined by Let us emphasize that we do not actually expect a one-to-one correspondence between surface patches. Later we will relax this assumption and in particular allow for deformations $\phi$ with $\phi(\omega_A)\subset\omega_B$. The complete mapping is illustrated in FIG. 3. In FIG. 3, the matching function $\phi_M := x_B \circ \phi \circ x_A^{-1}$ A is a mapping between the corresponding shaded regions of the two surfaces. The partial correspondence is defined on $\omega_A[\phi]: \omega_A\cap\phi^{-1}(\omega_B)$.

Now let us focus on the distortion from the surface $M_A$ onto the surface $M_B$. In elasticity, the distortion under an elastic deformation $\phi$ is measured by the Cauchy-Green strain tensor $D\phi^T D\phi$. We adapt this definition to measure distortion between tangent vectors on the two surfaces, as we did with the metric g above. Therefore, we properly incorporate the metrics $g_A$ and $g_B$ at the deformed position and obtain the distortion tensor $\zeta[\phi]\in\mathbb{R}^{2,2}$ given by $$G[\phi] = g_A^{-1} D\phi^T (g_B \circ \phi) D\phi,$$

which acts on tangent vectors on the parameter domain $\omega_A$, where products are denoted in matrix notation. Mathematically, this tensor is defined implicitly via the identity $(g_A\zeta[\phi]v)\cdot w = (g_B\circ\phi)D\phi v \cdot D\phi w$ for tangent vectors v, w on the surface $M_A$ and their images as tangent vectors $D\phi v$, $D\phi w$ on $M_B$, where here we have identified tangent vectors on the surfaces with vectors in the parameter domains.

As in the parameterization case, one observes that $\sqrt{tr(\zeta[\phi])}$ measures the average change of length of tangent vectors from $M_A$ when being mapped to tangent vectors on $M_B$ and $\sqrt{det(\zeta[\phi])}$ measures the change of area under the deformation $\phi_M$. Thus $tr(\zeta[\phi])$ and $det(\zeta[\phi])$ are natural variables for an energy density in a variational approach measuring the regularity of a surface deformation, $$E_{reg}[\phi] = \int_{\omega_A} W(tr(G[\phi]), det(G[\phi])) \sqrt{detg_A}\, d\xi. \quad (2.7)$$

This simple class of energy functionals was previously derived above from a set of natural axioms for measuring the distortion of a single parameterization. In particular, the following energy density $$W(a, d) = \alpha_l a + \alpha_a \left(d + \left(\frac{\alpha_l}{\alpha_a} + 1\right) d^{-1}\right) \quad (2.8)$$

accounts for length distortion with $a=a(A)=tr(\zeta[\phi])$, area expansion with $d=d(A)=det(\zeta[\phi])$ and area compression with $d^{-1}$ in a similar manner to (2.5). The parameters $\alpha_l, \alpha_a > 0$ are typically chosen by the user according to the relative importance of length and area distortion.

Measuring Bending in a Deformation

When we press a given surface $M_A$ into the thin mould of the surface $M_B$, a major source of stress results from the bending of normals. We assume these stresses to be elastic as well and to depend on changes in normal variations under the deformation. Variations of normals are represented in the metric by the shape operator. We defer the derivation of the shape operators $S_A$ and $S_B$ of the surface patches $M_A$ and $M_B$ to the Appendix, where we end up with $tr(S_B \circ \phi) - tr(S_A)$ as a measure for the bending of normals.

Since the trace of the shape operator is the mean curvature, we can instead aim to compare the mean curvature $h_B = tr(S_B)$ of the surface $M_B$ at the deformed position $\phi_M(x)$ and the mean curvature $h_A = tr(S_A)$ of the surface $M_A$. A similar observation was used in [21] to define a bending energy for discrete thin shells. This proposed simplification neglects any rotation of directions due to the deformation, e.g., if the deformation aligns a curve with positive curvature on the first surface to a curve with negative curvature on the second surface and vice versa, an energy depending solely on $h_B \circ \phi - h_A$ does not recognize this mismatch.

Nevertheless, in practice the bending energy $$E_{bend}[\phi] = \int_{\omega_A} (h_B \circ \phi - h_A)^2 \sqrt{detg_A}\, d\xi \quad (2.9)$$

turns out to be effective and sufficient. By minimizing this energy, we ensure that the deformation properly matches mean curvature on the surfaces.

Matching Features

Frequently, surfaces are characterized by similar geometric or texture features, which should be matched properly as well. Therefore we will incorporate a correspondence between one-dimensional feature sets in our variational approach to match characteristic lines drawn on the surface. In particular, we prefer feature lines to points for the flexibility afforded to the user, as well as to avoid the theoretical problems introduced by point constraints [9]. We will denote the feature sets by $F_{M_A} \subset M_A$ and $F_{M_B} \subset M_B$ on the respective surfaces. Furthermore, let $F_A \subset \omega_A$ and $F_B \subset \omega_B$ be the corresponding sets on the parameter domains. We are aiming for a proper match of these sets via the deformation, i.e., $$\phi_M(F_{M_A}) = F_{M_B}$$

or in terms of differences, $F_{M_A} \backslash \phi_M^{-1}(F_{M_B}) = 0$ and $F_{M_B} \backslash \phi_M (F_{M_A}) = 0$ A rigorous way to reflect this in our variational approach is with a third energy contribution, $$E_F[\phi] = H^1(F_{M_A} \backslash \phi_M^{-1}(F_{M_B})) + H^1(F_{M_B} \backslash \phi_M(F_{M_A})) \quad (2.10)$$

where $H^1(A)$ is the one-dimensional Hausdorff measure of a set A on the corresponding surface. Roughly speaking, this gives a symmetric measurement of the size of the mismatch of the features. This type of energy does not lend itself to a robust numerical minimization. Therefore, we will instead consider a suitable approximation of (2.10) that involves the distance on the surface to the feature sets, and define $$\tilde{E}_F^\epsilon[\phi] = \int_{\omega_A} (\eta^\epsilon \circ d_A(\xi))(\theta^\epsilon \circ d_B(\phi(\xi))) \sqrt{detg_A}\, d\xi + \int_{\omega_B} (\eta^\epsilon \circ d_B(\xi))(\theta^\epsilon \circ d_A(\phi^{-1}(\xi))) \sqrt{detg_B}\, d\xi \quad (2.11)$$

where $dA(\cdot) = distA(\cdot, A)$ and $dB(\cdot) = distB(\cdot, A)$ are distance functions on the parameter domains $\omega_A$ and $\omega_B$ with respect to some set A on the corresponding surface. Note that we measure distance either in the metric $g_A$ on $\omega_A$ or in the metric $g_B$ on $\omega_B$.

Additionally, we define the localization functions $$\eta^\epsilon(s) = \frac{1}{\epsilon} \max\left(1 - \frac{a}{\epsilon}, 0\right), \theta^\epsilon(s) = \min\left(\frac{s^2}{\epsilon}, 1\right)$$

which act as cut-off functions. For Lipschitz continuous feature sets and bi-Lipschitz continuous deformations, we observe that $\tilde{E}_F^\epsilon[\phi] \to E_F[\phi]$ as $\epsilon \to 0$, which motivates our approximation. In view of the later discretization, we can reformulate the second term in (2.11) as $$\int_{\omega_A} (\eta^\epsilon \circ d_B(\phi(\xi)))(\theta^\epsilon \circ d_A(\xi)) \sqrt{detg_B(\phi(\xi))}\, det\, D\phi d\xi.$$

Partial Correspondence

Usually, we cannot expect that $\phi_M(M_A) = M_B$, particularly near the boundary where certain subregions of $M_A$ will have no corresponding counterpart on $M_B$ and vice versa. Therefore, we must allow for points on $M_B$ with no pre-image in $M_A$ under a matching deformation $\phi_M$, and points on $M_A$ which are not correlated to points on $M_B$ via $\phi_M$ (see FIG. 3). Thus we must adapt the variational formulation accordingly. If $\phi(\omega_A) \neq \omega_B$, then $\phi_M$ is now defined on $x_A(\omega_A[\phi])$ only, where $$\omega_A[\phi] := \phi^{-1}(\phi(\omega_A) \cap \omega_B)$$

is the corresponding subset of the parameter domain $\omega_A$. Furthermore, we define new energies:

$$E_{bend}[\phi] = \int_{\omega_A[\phi]} (h_B \circ \phi - h_A)^2 \sqrt{detg_A}\, d\xi, \quad (2.12)$$

$$E_F[\phi] = H^1(\omega_A[\phi] \cap F_{M_A} \backslash \phi_M^{-1}(F_{M_B})) + H^1(F_{M_B} \backslash \phi_M(\omega_A[\phi] \cap F_{M_A})). \quad (2.13)$$

For an energy that controls tangential distortion, it is still helpful to control the regularity of the deformation outside the actual matching domain $\omega_A[\phi]$, where we would like to allow significantly larger deformations by using a "softer" elastic material. Hence we will suppose that $g_B$, which is initially only defined on $\omega_B$, is extended to $\mathbb{R}^2$ and takes on values that are relatively small to allow for greater stretching.

In the minimization algorithm, we need descent directions which will involve derivatives of these energies with respect to the deformation $\phi$. In taking these derivatives, integrals over the variable boundary $\partial \omega_A[\phi]$ will appear. Since these are tedious to treat numerically, we will rely on another approximation for the sake of simplicity. Our strategy here is to change the domain of integration $\omega_A[\phi]$ to a superset $\omega$ which extends beyond the boundary $\partial \omega_A[\phi]$. Doing so means that special treatment of boundary integrals is no longer necessary, although we are now required to evaluate the integrands of the energies outside of $\omega_A$, and similarly for deformed positions outside of $\omega_B$. To achieve this, we will extend our surface quantities onto $\omega \backslash \omega_A$ and $\omega \backslash \omega_B$, respectively, by applying a harmonic extension with natural boundary conditions on $\partial \omega$ to $g_A$, $g_B$ and $h_A$, $h_B$ (e.g., we define $h_A$ as the solution of Laplace's equation on $\omega \backslash \omega_A$ with vanishing flux on $\partial \omega$). Additionally, we introduce a regularized characteristic function $$X_A^\epsilon(\xi) = \max(1 - \epsilon^{-1} \text{dist}(\xi, A), 0) \qquad (2.14)$$

to cause the energy contributions to be ignored at some distance $\epsilon$ away from $\omega_A[\phi]$. Thus, instead of dealing with a deformation dependent-domain $\omega[\phi]$ in the definition of our different energy contributions, we always integrate over the whole image domain $\omega$ and insert the product of the two regularized characteristic functions:

$$X^\epsilon(\xi) = X_{\omega_A}^\epsilon(\xi) X_{\omega_B}^\epsilon(\phi(\xi))$$

as an additional factor in the energy integrand. We apply this modification to the energy $E_{bend}$ (2.9) and the already regularized energy $\tilde{E}_F^\epsilon$ (2.11) and denote the resulting energies by $$E_{bend}^\epsilon \text{ and } E_F^\epsilon, \qquad (2.15)$$

respectively.

Definition of the Matching Energy

We are now ready to collect the different cost functionals and define the global matching energy. Depending on the user's preference, we introduce weights $\beta_{bend}$, $\beta_{reg}$, $\beta_F$ for the approximate energies in (2.15)—we have found that $\beta_{bend}=1$, $\beta_{reg}=0.01$, $\beta_F=5$ work well—and define the global energy $$E^\epsilon[\phi] = \beta_{bend} E^\epsilon_{bend}[\phi] + \beta_{reg} E_{reg}[\phi] + \beta_F E^\epsilon_F[\phi] \qquad (2.16)$$

which measures the quality of a matching deformation $\phi$ on the domain $\omega$. Finally, in the limit $\epsilon \to 0$ we obtain a weighted sum of (2.7), (2.12) and (2.13):

$$E[\phi] = \beta_{bend} E_{bend}[\phi] + \beta_{reg} E_{reg}[\phi] + \beta_F E_F[\phi]. \qquad (2.17)$$

We call a matching deformation $\beta$-optimal if it minimizes the energy (2.17) for a specific set of parameters $\beta = (\beta_{bend}, \beta_{reg}, \beta_F)$. One can prove the existence, global injectivity, and regularity of $\beta$-optimal matching deformations [17]. Because of this proof, we can expect to obtain smooth deformations that are free of folds and singularities.

Algorithms

The variational framework described above provides us with a solid foundation on which to design numerical methods for generating parameterizations. In the discrete setting, we assume that the surface patches are given as triangle meshes. In this chapter, we provide the algorithms for generating optimal, discrete surface parameterizations and surface matches, respectively. The general procedure is the same for both of these methods. We begin with an initial mapping of the surface to a triangulated parameter domain. A straightforward finite element discretization follows, which describes the function space of elastic deformations over this domain.

We then employ standard methods from numerical optimization to generate an optimal deformation that minimizes a variational energy. The energy, which is defined at the discrete level, properly accounts for the geometry of the surface through the discrete metric of the initial parameterization. The algorithms are guaranteed to generate an optimal mapping that retains the analytic properties which we derived earlier, including smoothness and local bijectivity. We will now turn to the description and analysis of the surface parameterization algorithm, followed by the surface matching algorithm.

The Parameterization Algorithm

Figure 4:
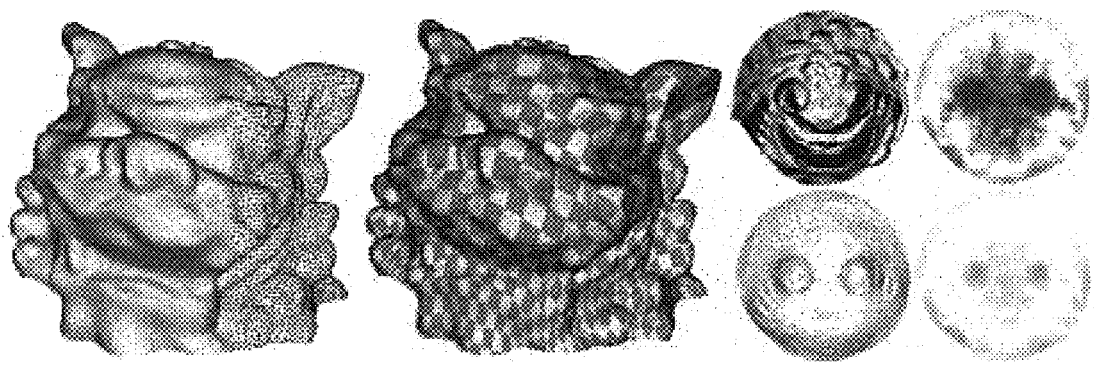
FIG. 4 illustrates a surface mesh, a parameterization for the surface mesh, and a parameter domain optimized through the minimization of energy functions which control length, area and angle distortion in accordance with one or more embodiments of the invention.

We shall now describe a method for constructing an optimal parameterization for a discrete surface patch. We assume that the surface patch M is provided as a manifold triangle mesh with boundary. A discrete parameterization $x:\omega \to M$ is a piecewise-affine mapping on the triangles in the parameter domain $\omega \subset \mathbb{R}^2$ to the corresponding triangles in $\mathbb{R}^3$. The algorithm generates an optimal, discrete deformation $\tilde{\phi}:\omega \to \mathbb{R}^2$ which we apply directly to the planar triangulation $\omega$ to obtain the optimal parameter domain $\omega[\tilde{\phi}] := \tilde{\phi}(\omega)$ (see FIG. 1). The final parameterization is fully defined by the coordinates assigned to the vertices of the triangles in $\omega[\tilde{\phi}]$ (e.g., as "texture coordinates" for texture mapping, FIG. 4). In FIG. 4, for a surface mesh (left, 36k triangles), a parameterization is computed, depicted through a texture map (middle). The parameter domain (right) is optimized through the minimization of energy functions which control length, area and angle distortion (shown clockwise from top right; dark regions indicate higher energy).

The user controls the parameterization through the choice of parameters $\alpha = (\alpha_l, \alpha_a, \alpha_c)$ that balance the trade-off between length, area and angle distortion, respectively. For example, specifying a larger value for $\alpha_a$ will result in a parameterization that is biased toward low area distortion at the expense of greater length and angle distortion, etc. The parameters must satisfy the conditions stated in (2.6), namely:

$$\alpha_l > 0, \alpha_a \geq 0, \alpha_c \geq 0.$$

In practice, we normalize the parameters using $\alpha_l + \alpha_a + \alpha_c = 1$ for the sake of better numerics.

We will now turn to the main steps in the invention/algorithm:

1. Construct an initial parameterization of the surface.
2. Optimize the parameterization through a discrete deformation of the parameter domain that minimizes the energy $E[\cdot]$ defined in (2.5).

Initial Parameterization

The invention requires that an initial parameterization be provided for the subsequent optimization of the parameter domain. With this optimization step in mind, we desire an initial parameterization that is close to optimal to make the energy minimization more efficient. It follows that this parameterization should already have low distortion. Moreover we advocate choosing an initial parameterization with natural boundary conditions over a constrained boundary, e.g., a convex polygon in the plane. In the latter case one often encounters extreme shearing and compression in the boundary elements which is difficult to correct through numerical optimization.

For this purpose we use the natural conformal map [15] in our examples (also known as the least squares conformal map [29]). This parameterization has low angle distortion and natural boundary conditions, and is cheap to compute since it only requires the solution of a sparse linear system. Other free-boundary parameterization algorithms can be used (e.g., [26, 46]) provided that the initial parameterization is admissible.

Recall from the above description, that the energy (2.5) is a function of the principal invariants of the inverse metric $g^{-1}$. On inspection only the conformal (third) term in the energy is unaffected by uniformly scaling the surface patch M or the parameter domain ω. In practice, the parameterization energy is preferably scale-invariant. In many applications the scale of the ambient space in $\mathbb{R}^3$ and the parameter space in $\mathbb{R}^2$ are chosen independently and therefore a parameterization energy that identifies these scales does not fit within the application framework. Furthermore, it is unreasonable to expect the numerical optimization method to make up the difference in scale during the energy minimization, as this requires extra computation and can become a source of instability due to the large magnitude of the gradients for the length and area terms. One solution is to reformulate the energy so that these terms are scale-invariant. However a simpler solution is to uniformly scale the parameter domain by a factor σ prior to the optimization step.

Following [44], we let σ be the ratio of the surface area versus the area of the domain triangulation, so that σ=1 for any isometric parameterization of a developable surface. When the optimal parameterization is constructed, the parameter domain is returned to its original scale using the inverse scale factor $\sigma^{-1}$.

Finite Element Discretization

Suppose that ω is an admissible triangle mesh in the parameter space $\mathbb{R}^2$ and let T denote the triangles of ω. A discrete deformation $\phi:\omega\to\mathbb{R}^2$ is a vector-valued function, whose components are piecewise-affine, continuous functions. For these deformations we have to evaluate the discrete counterpart of energy functional (2.5), $$E[\phi] = \sum_{T\in\omega} W(tr(C[\phi]), \det(C[\phi])) \sqrt{\det g}\ |T|$$

with the area of a triangle in the plane denoted by |T|. On each triangle T∈ω, a constant Cauchy-Green strain tensor is defined by $C[\phi]:=D\phi g^{-1} D\phi^T$ where the derivative Dφ and the discrete metric g are constant matrices in $\mathbb{R}^{2,2}$.

Besides evaluating the discrete energy for a given deformation φ, we have to compute the gradient ∇E[φ] and (optionally) the Hessian $\nabla^2 E[\phi]$ in the actual minimization algorithm, which requires the differentiation of the discrete energy with respect to the discrete deformation. All the necessary expressions to assemble these matrices are provided in the Appendix.

A necessary condition for a discrete deformation φ to minimize the energy is ∇E[φ]=0. Due to our assumption of frame indifference (2.2) the energy is invariant under Euclidean motion. To remove these degrees of freedom we add two constraints on the zero moment $M_0(\phi)$ to eliminate translations, and one on the angular momentum $M_1(\phi)$ to cancel the rotations:

$$M_0(\phi):=\int_\omega \phi(\xi) d\xi = 0$$

$$M_1(\phi):=\int_\omega [\phi(\xi)_2 \xi_1 - \phi(\xi)_1 \xi_2] d\xi = 0$$

To provide the necessary normalization with respect to rigid body motions, we employ Lagrange multipliers for the moment constraints. Effectively, the discrete energy E[φ] is replaced by a modified energy $$\overline{E}[\phi, \lambda] = E[\phi] + \begin{pmatrix} \lambda_1 \\ \lambda_2 \end{pmatrix} \cdot M_0(\phi) + \lambda_3 M_1(\phi).$$

Instead of solving ∇E[φ]=0 for φ one now solves the equation $\nabla \overline{E}[\phi] = 0$ for the deformation φ and the Lagrange multipliers $\lambda_1, \lambda_2, \lambda_3$. To find the minimum of this energy with a Newton method one also needs the Hessian. Based on $\nabla^2 D[\phi]$ we obtain $$\nabla^2 \overline{E}[\phi, \lambda] = \begin{pmatrix} \nabla^2 \overline{E}[\phi] & M \\ M^T & 0 \end{pmatrix}$$

using $$M = \begin{pmatrix} m & 0 & -m \\ 0 & m & m \end{pmatrix};$$

where m is the vector of masses of the nodal basis functions, i.e., $$m^k := \sum_{N^k} \frac{1}{3}|T|$$

with $N^k$ denoting the set of triangles incident to vertex k=1, ..., n. Note that while this new Hessian $\nabla^2 \overline{E}[\phi, \lambda]$ is not positive definite, it does not pose a problem for our algorithm as we explain below.

Numerical Optimization

We use an iterative approach to find a sequence of discrete deformations $\{\phi_i\}_{i=0...N}$ such that $\phi_N$ minimizes the discrete energy E[·], i.e., $E[\phi_0] > E[\phi_1] > ... > E[\phi_N]$ and $\nabla E[\phi_N] = 0$. The optimal deformation $\tilde{\phi} = \phi_N$ thus generates the final, optimal parameterization $x[\tilde{\phi}] := x \circ \tilde{\phi}^{-1}$.

Because our energy is polyconvex, it has multiple local minima and therefore it is non-trivial to guarantee that one will find a global minimum. Our strategy is to find a local energy minimum starting from a reasonable initial guess, namely, the initial parameterization. It follows that the minimizing sequence of deformations begins with $\phi_0$ being the identity function.

We use a simple line search method to find $\tilde{\phi}$ (See FIG. 5). FIG. 5 illustrates pseudo-code for the optimization algorithm in accordance with one or more embodiments of the invention. Each iteration of the line search computes a search direction $\psi_i$ and then decides how far to step in this direction. The iteration is given by $$\phi_{i+1} \leftarrow \phi_i + \tau_i \psi_i$$

Many classical numerical methods can be used to compute $\psi_i$ (FIG. 5 search direction). There is a typical trade-off between performance, in terms of the number of iterations to converge to the minimum, and the complexity of algorithm, which is related to what local model of the energy landscape is used in selecting the search direction. For example, the simplest gradient descent method relies only on the local gradient, i.e., $\psi_i = \nabla E[\phi_i]$, but it has poor convergence properties.

We chose to use a Newton method in our implementation because it guarantees a quadratic rate of convergence close to an optimal solution (Chapter 3, [38]). It computes $\psi_i$ by solving a sparse linear system, $$\nabla^2 \overline{E}[\phi_i, \lambda] \begin{pmatrix} \psi_i \\ \mu \end{pmatrix} = \begin{pmatrix} \nabla E[\phi_i, \lambda] \\ 0 \end{pmatrix} \quad (3.1)$$

where $\mu \in \mathbb{R}^3$ appears due to the Lagrange multipliers in $\overline{E}[\cdot]$. For the solution of the linear saddle-point problem (3.1), one could apply Uzawa's algorithm [8]. We simply use a preconditioned conjugate gradient algorithm. We have never observed any difficulty in practice even though theoretically the matrix $\nabla^2 \overline{E}[\phi_i, \lambda]$ is not positive definite. As a preconditioner, we apply a diagonal preconditioning to $\nabla^2 \overline{E}$.

The next step is to determine the step size $\tau_i$ for the iteration (FIG. 5, step size). We require $\tau_i$ to be chosen such that the energy decreases at each iteration. We accomplish this with a simple step size control algorithm that uses the Armijo condition [38] to guarantee sufficient decrease of the energy functional (FIG. 6). FIG. 6 illustrates pseudo-code for the step size control algorithm in accordance with one or more embodiments of the invention. The parameters control how aggressively the algorithm is in taking large steps—we find that $\tau_i = 1$, $\rho = 0.08$, $c = 0.5$ work well in practice.

Beside asking for sufficient decrease of the energy, one must be concerned with taking legal steps. Our concern lies in the fact that an illegal step $\phi_i + \tau_i \psi_i$ that generates an inadmissible deformation could actually lower the energy. This problem can be seen directly from our energy functional (2.5). If a triangle element T reverses its orientation due to a fold in the deformation, one can experience a negative energy value. One can address this issue by defining $E[\phi]$ to be unbounded for $\det \phi < 0$, which is a natural extension of $E[\cdot]$ since $E[\phi] \to \infty$ as $\det \to \phi$. This is equivalent to simply disallowing a step for which $\det(\phi_i + \tau_i \psi_i) \leq 0$ on any triangle T.

We stop the line search method when the update is sufficiently small in the $L^2$ norm, controlled by the threshold parameter $\epsilon > 0$ (FIG. 5, stop). If we have reached a local minimum, i.e., $\nabla E[\phi_i] \approx 0$, then we have achieved the optimal deformation $\tilde{\phi} = \phi_i$.

The line search will also terminate if no further progress can be made to reduce the energy. This "locking" can occur when the line search gets lost in the energy landscape because of a poor choice for the initial parameterization. In this case, a simple continuation method on the energy parameters a can be used to set up a series of easier optimization problems, $$H(\phi, \theta) = E[\phi]|_{a = (1-\theta)a_0 + \theta a_1}$$

where the blend parameter $\phi \in [0,1]$ is chosen from a monotonically increasing sequence $\{\theta_j\}_{j=0 \ldots J}$ that transforms the energy landscape from $E[\cdot]|_{a_0}$ to the desired energy $E[\cdot]|_{a_1}$. The motivation comes from choosing $\alpha_0$ so that the initial parameterization is close to an optimal solution of $E[\cdot]|_{a_0} = H(\cdot, \theta_0)$ The minimizer of $H(\cdot, \theta_{j+1})$ is used as the initial parameterization for the next problem in the sequence, $H(; \theta_{j+1})$. Thus by completing this sequence one obtains the optimal deformation $\tilde{\phi}$ as the minimizer of $E[\cdot]|_{a_1} = H(; \theta_j)$. Generally speaking, naive continuation methods of this form can fail in practice [38]. However we have found this approach to be entirely sufficient for transforming solutions of one energy to another.

The Matching Algorithm

Above, we developed a variational framework for matching surface patches without regard to a particular discretization. Now we will describe our method for constructing a match based on a straightforward discretization using finite elements. We assume that the surface patches $M_A$ and $M_B$ are given as triangle meshes. In the initial step, we generate parameterizations which define triangulated parameter domains $\omega_A$ and $\omega_B$ using the approach described above. Because of the difficult algorithmic details, we do not wish to deal with effectively overlaying two triangulations during the numerical solver stage. Consequently we discretize the domain onto a regular grid ("image") and evaluate the associated surface quantities needed in the energies at each pixel (in effect we may think of this as a geometry image [22]).

This setup has two principal advantages: (1) the resolution of the original meshes is decoupled from the resolution used in the image domain and (2) multiscale algorithms are far simpler to implement in the regularly sampled image grid than over arbitrary triangle meshes (even if flat). In particular, we can use higher sampling rates in the image domain to alleviate aliasing problems. Additionally, the image pyramids used by a hierarchical solver have far more efficient memory access patterns on modern processors than one achieves with arbitrary meshes. We now turn to the basic components of the implementation:

1. Construct parameterizations for the surface patches.
2. (optional) Select matching features on the surfaces with separate texture maps.
3. Evaluate the metric and mean curvature by scan converting the surface triangulation in the parameter domain.
4. Apply a finite element discretization and optimize the matching deformation using a multiscale approach to minimize the energy $E^\epsilon[\cdot]$ defined in (2.16).

Figure 7:
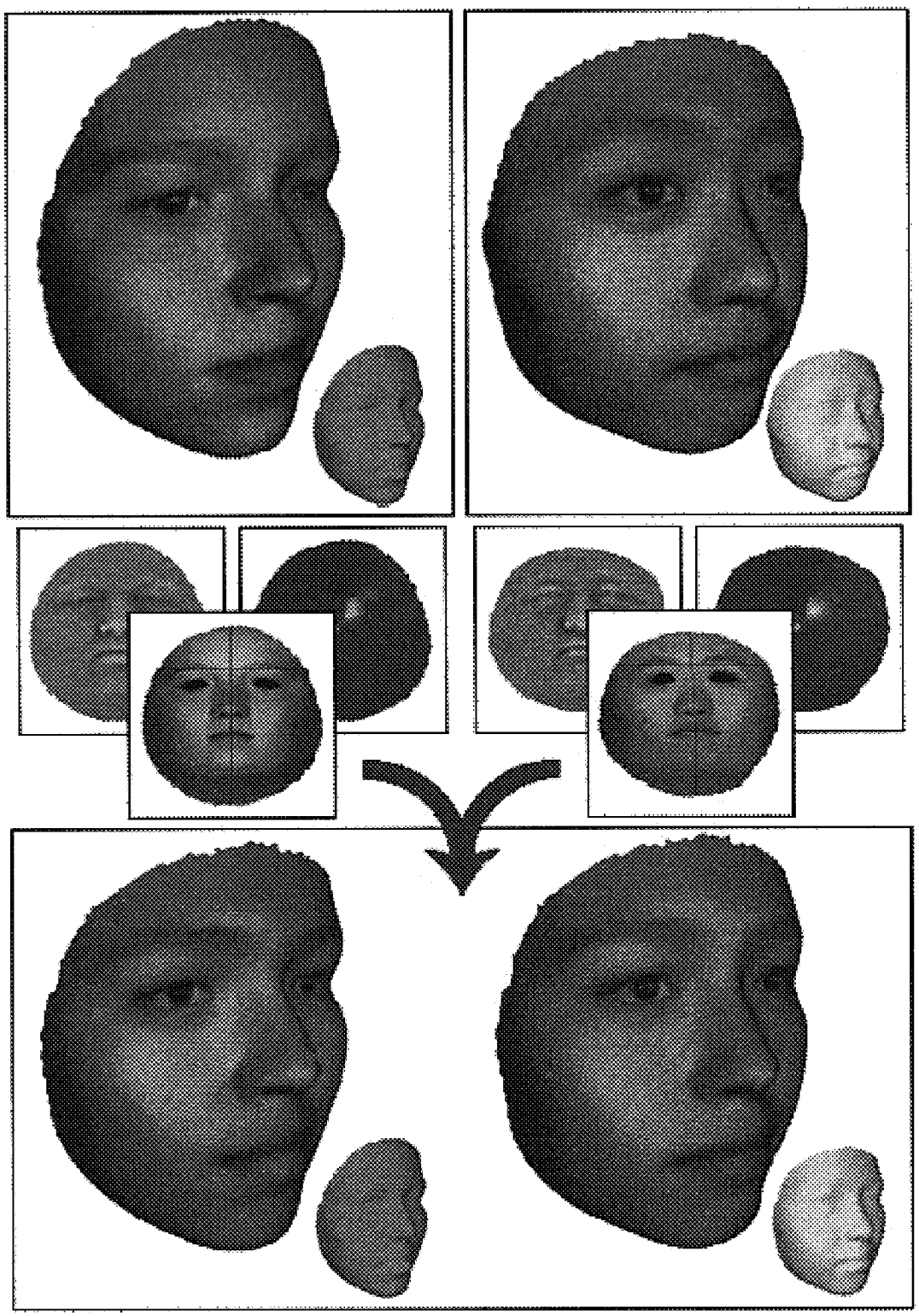
FIG. 7 provides a brief overview of a surface matching process in accordance with one or more embodiments of the invention.

FIG. 7 provides a brief overview of our surface matching process in accordance with one or more embodiments of the invention. The two surfaces to be matched are parameterized (top); we generate images of mean curvature, the metric and user-defined feature sets on a 256×256 grid (middle); an optimal matching deformation is then found through a global energy relaxation in the parameter domain using fast multiscale algorithms. The match is properly defined in 3D by incorporating the metric in the matching energy. A finely detailed texture is transferred to the first surface, and a 50% morph is created (bottom). The match took under 3 min.

Surface Patch Parameterization

We are interested in low distortion parameterizations to ensure an adequate sampling and to keep the energy landscape as nice as possible. Recall that the metric of the parameterization enters into our energy formulation. Therefore, parameterizations with unnecessarily large gradients only serve to make the energy minimization problem harder. We address these issues by applying the algorithm from above to parameterize the surfaces. In practice, we find that $$\alpha_l = \alpha_a = \alpha_c = \frac{1}{3}$$

nicely for this purpose.

Once both surfaces have been parameterized, we perform a rough alignment by applying a normalizing transformation such that the parameter domains are subsets of the domain $\omega := [0,1]^2$. Due to the feature energy contribution from (2.11) and the hierarchical nature of the minimization algorithm this rough alignment is entirely sufficient.

Feature Set Construction

Figure 8:
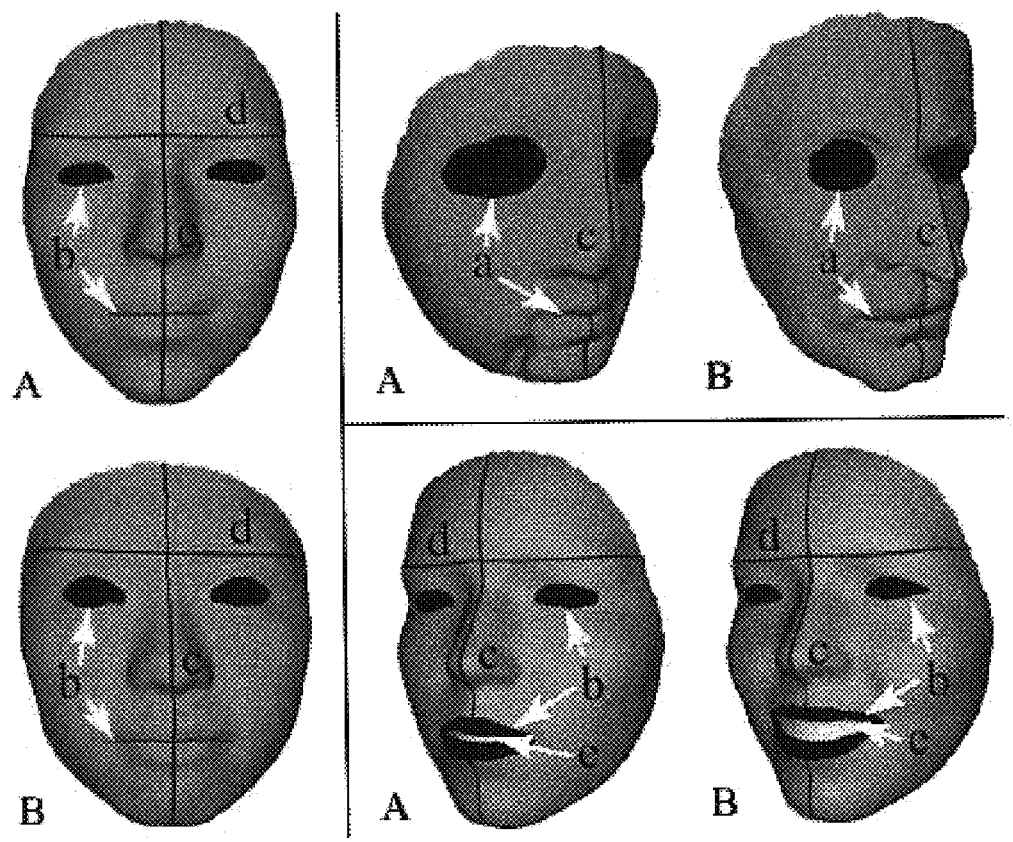
FIG. 8 illustrates examples of user-defined feature sets: (a) coarse registration of geometric features; (b) aligning texture features; (c) lines of symmetry; (d) preventing smooth, rigid regions from sliding; and (e) increasing the elasticity of highly deformable regions in accordance with one or more embodiments of the invention.

The user can control the match by identifying sets of similar features on the surface patches. The cost functional $E_F^\epsilon[\cdot]$ from (2.11) helps to guide the energy minimization to match the corresponding features. Marking the desired feature set $F_A$ is most easily accomplished in the image domains. FIG. 8 gives examples of these, showing the texture images mapped onto the surfaces. In this regard, FIG. 8 provides examples of user-defined feature sets: (a) coarse registration of geometric features; (b) aligning texture features; (c) lines of symmetry; (d) preventing smooth, rigid regions from sliding; and (e) increasing the elasticity of highly deformable regions.

The actual feature sets are the boundaries of the (pixel) regions drawn by the user on the texture image. Note that when we match features, we do not constrain points since this would break the regularity of the deformation. Instead, we match feature curves which permits sliding of the deformation along the curve. There are many ways in which features can be used to control a match:

Coarse control of the match is achieved by roughly selecting corresponding geometric features and gradually decreasing $\beta_F$ to zero as the multiscale method goes to finer resolutions (FIG. 8a).

Precise control over matching texture features (e.g., on the face, etc.) is achieved by selecting the corresponding pixels in the feature set image (FIG. 8b).

Lines of symmetry drawn as features allow deformations tangential to the feature boundary, but prevent deformations that are transverse to it (FIG. 8c).

In general, features tend to localize the matching deformation, i.e., the feature boundaries partition the domain into deformable regions and minimize the deformation between these regions. This is useful when the surface is composed of regions with different elastic properties and prevents excessive "sliding" of the surface (e.g., the highly deformable face versus the forehead, FIG. 8d). Sometimes it is necessary to relax the regularization energy to allow very large deformations in a certain region (e.g., opening the mouth, FIG. 8e). We achieve this by decreasing $\beta_{reg}$ in the selected region.

The distance maps used in the definition of the feature energy are discretized by an upwind scheme for the corresponding Eikonal equations [40] (FIG. 9c). We used the particular upwind finite element algorithm of Bornemann [6] since it fits well with our overall finite element framework. Multiple sets of overlapping features are accounted for by taking the distance to the nearest feature to create a single distance map.

Evaluation of Surface Properties

Figure 9:
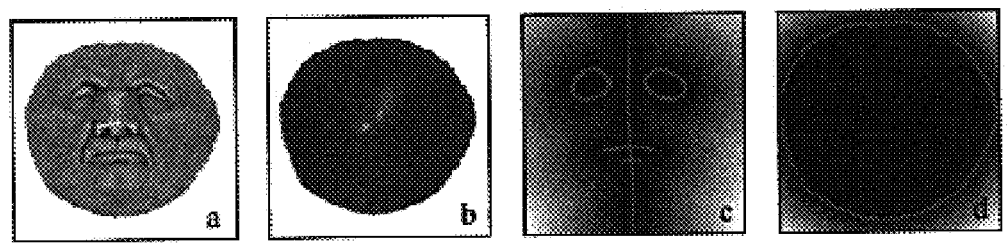
FIG. 9 illustrates surface properties that are evaluated once and rasterized into images for (a) mean curvature; (b) the metric tensor with components shown as rgb values; (c) the distance map for the feature set shown in red; and (d) the distance map for the characteristic function, with the domain boundary in blue in accordance with one or more embodiments of the invention.

The matching energy needs to evaluate surface quantities such as the mean curvatures $h_A$, $h_B$, metric tensors $g_A$, $g_B$, distance to the feature sets $F_A$, $F_B$, and signed distance to the domain boundaries $\partial\omega_A$, $\partial\omega_B$ in the case of (2.14). Since all of these are constants in the energy they only need to be discretized into appropriate textures once in the beginning. We achieve this through rendering the flattened triangulations with appropriate values at the vertices interpolated across triangles (FIG. 9). FIG. 9 illustrates surface properties that are evaluated once and rasterized into images for (a) mean curvature $h_A$; (b) the metric tensor $g_A$, with components shown as rgb values; (c) the distance map for the feature set $F_A$, shown in red; and (d) the distance map for the characteristic function $X_A^\epsilon$, with the domain boundary $\partial\omega_A$ in blue.

For $h_A$ we use the magnitude of the mean curvature normal [16, 34]. The sign is chosen according to the surface normal, which we take to be the area-weighted sum of triangle normals around a vertex. Other measurements for the mean curvature would work equally well (see [34] for a survey). Since $g_A$ is symmetric and constant over each triangle element, we can evaluate its three unique components as a function of the triangle vertices. The calculation of the Jacobian of the parameterization over a triangle is well documented in the parameterization literature (e.g., see [44]). The distance map for $F_A$ is described above and illustrated in FIG. 9 c. To compute the distance map for the characteristic function, we rasterize the domain of $M_A$ and then generate its signed distance field in a similar manner to $F_A$ (FIG. 9d).

Multiscale Finite Element Method

Figures 10, 11:
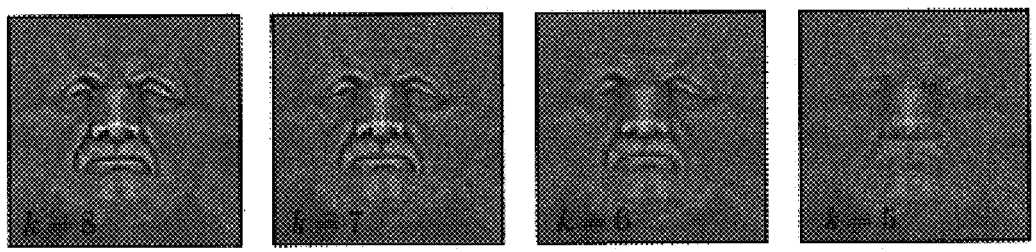
FIG. 10 illustrates pseudo-code for the multiscale algorithm in accordance with one or more embodiments of the invention.
FIG. 11 shows images representing a scale of filtered mean curvature functions on the parameter domain of a surface in accordance with one or more embodiments of the invention.

The total energy $E[\cdot]$ is highly non-linear. In particular the bending energy causes many local minima in the energy landscape over the space of deformations. We take a multiscale approach, solving a sequence of matching problems from coarse to fine scales. This type of method is frequently applied and well understood in image processing [2], allowing for a robust and efficient global minimization on complicated energy landscapes (FIG. 10). FIG. 10 illustrates pseudo-code for the multiscale algorithm in accordance with one or more embodiments of the invention.

To begin, let us define a sequence of energies $(E^{\sigma k})_{k=0,\ldots m}$ corresponding to scale parameters $\sigma_0 > \sigma_1 > \ldots > \sigma_m = 0$, which act as filter parameters and range from coarse to fine scale. In essence the energy landscape is smoothed, enabling "basin catching" at coarse levels to provide good starting guesses for subsequently finer levels. Note that it is not necessary to compute the exact minimizer on every coarse scale. Instead we apply a non-linear conjugate gradient method with respect to the standard $L^2$ metric on the space of deformations, and use the Armijo condition for step size control (FIG. 10, minimize).

We stop iterating as soon as the update is sufficiently small in the $L^2$ norm. In practice this proves to be a good heuristic to ensure that at the time we stop on level k with a deformation $\phi^k$, this deformation is already in the contraction region of the global minimum on the next finer scale k+1 (FIG. 10, prolongate). The prolongation of $\phi^k$ to $\phi^{k+1}$ is performed using bilinear interpolation.

It remains for us to define the scale of energies. First, we replace the functions on the surfaces as they appear in the different energy functionals by pre-filtered, smoothed representations (FIG. 10, filter). A Gaussian filter of width $\sigma_k$ is used to define the smoothing on the surfaces $M_A$ and $M_B$. Exploiting the connection between Gaussian filtering and the fundamental solution of the heat equation, we replace the mean curvatures $h_A$ and $h_B$ (appearing in the bending energy) by pre-filtered mean curvature functions $h_A^{\sigma k}$ and $h_B^{\sigma k}$. This amounts to applying the appropriate filter kernels to the corresponding $h_A$ and $h_B$ images.

FIG. 11 shows images representing a scale of filtered mean curvature functions $h_A^{\sigma k}$ on the parameter domain of a surface $M_A$. Similarly, we filter the metric tensors $g_A$ and $g_B$ component-wise. As illustrated in FIG. 11, the mean curvature function $h_A$ is extended to the full image domain $\omega$ and successively restricted to coarser grids k=8, ..., 0 from the multigrid pyramid.

The regularization parameter $\epsilon$ in the definition of the energies also depends on the sequence of scale parameters and is set to $\epsilon(\sigma_k)=2\sigma_k$. For the matching problems considered herein, we start with $\sigma_0=1$, and define $$\sigma_k = \frac{1}{2}\sigma_{k-1}$$

for k=1, . . . m. In our examples the parameter domains are discretized with a 256×256 grid and have a maximal number of m=8 scales.

Analysis

This section of the document investigates the performance and robustness of the algorithms. We will demonstrate through a series of experiments the characteristic behaviour of these algorithms in practical test scenarios. The tests focus on parameterizations of physically-acquired triangle mesh data. Physical surfaces undeniably provide the largest variety of detail across many scales, so much so that modern aquisition methods often have difficulty producing data that is suitable for use without further processing. Establishing parameterizations for this data is one important form of pre-processing. Our challenge lies in the wide variety of shapes and the varying quality of the triangle meshes, which tax the performance and robustness of our numerical methods in different ways. We show evidence of efficiency and stability through our implementation of parameterization.

Surface Parameterization

The following provides demonstrations of the parameterization algorithm described above. These feature typical but nonetheless challenging examples of parameterizations aimed at measuring the performance of our method. Fundamentally, we expect that the parameterizations generated for discrete surfaces uphold the principles that we established in our variational model for continuous surfaces. The central tenet is the existence of a continuous and locally bijective parameterization that is optimal for a given set of parameters $\alpha=(\alpha_l, \alpha_a, \alpha_c)$, which is summarized in Theorem 2.2. Moreover, the parameterization should be robust subject to different triangulations of the surface geometry, due to the finite element discretization of the parameterization energy. Finally, we expect the distortion in the parameterizations to be distributed in relative accordance with the user's choice of parameters $\alpha$. The following examples show that all of these requirements are satisfied in our implementation.

Convergence of the Optimization Algorithm

Figure 12:
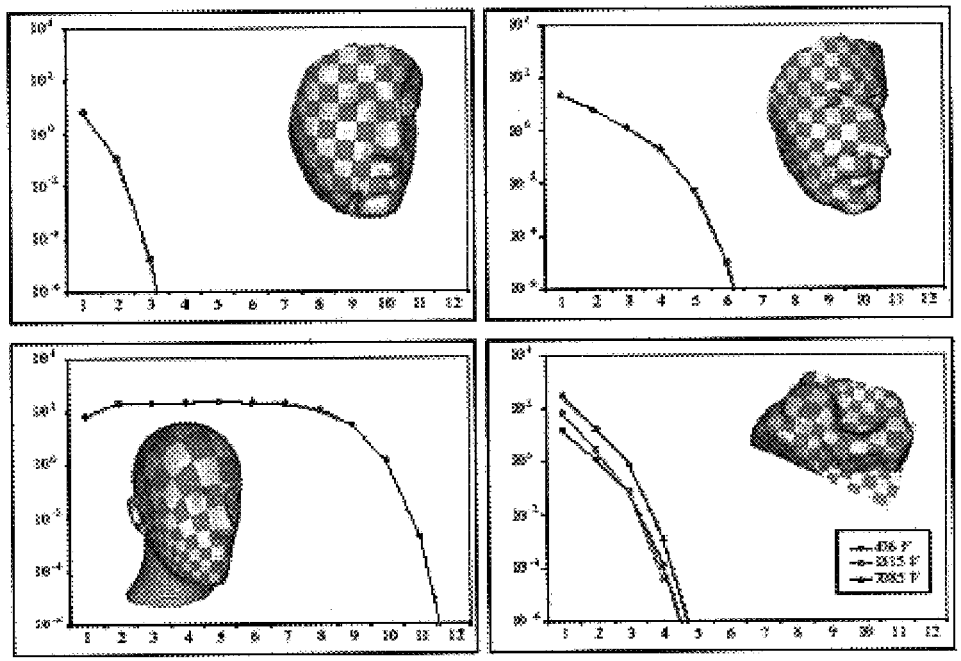
FIG. 12 plots the energy decay for a series of examples, in which a quasiconformal initial parameterization is optimized in accordance with one or more embodiments of the invention.

For global energy minimization methods one is typically concerned with the rate of convergence to an optimal solution (if convergence occurs at all) and the number of iterations spent in the minimization algorithm. FIG. 12 plots the energy decay for a series of examples, in which a quasiconformal initial parameterization due to [15, 29] is optimized based on our own nearly conformal energy ($\alpha_c \gg \alpha_l, \alpha_a$). Thus, FIG. 12 plots the energy decay for the sequence of deformations computed in the parameterization energy minimization algorithm. A quadratic rate of convergence is experienced near the optimal solution.

The vertical axis measures the $L^2$ norm of the energy gradient on a logarithmic scale, i.e., $\log_{10}(\|\nabla E[\cdot]\|_2$. The trend of these graphs shows that when the deformation $\phi_i$ is sufficiently close to the optimal solution, the Newton method achieves its optimal quadratic rate of convergence. In all of these examples the maximum step size ($\beta=1$) was chosen at each iteration which further supports the choice of a Newton method for our problem.

TABLE 1

Performance figures for examples of nearly conformal parameterizations (V, F denote # vertices and # faces, respectively, for triangle mesh M).

| M | V | F | $\alpha = (\alpha_l, \alpha_a, \alpha_c)$ | Iterations | Time |
|---|---|---|---|---|---|
| igea | 7427 | 14611 | (0.5, 0.5, 99) | 4 | 0 m 59 s |
| maxplanck | 8991 | 17755 | (1, 1, 98) | 7 | 2 m 27 s |
| mannequin | 2732 | 5420 | (0.5, 0.5, 99) | 12 | 0 m 16 s |
| sphere | 4159 | 8184 | (0.5, 0.5, 99) | 5 | 0 m 17 s |
| stampedpart | 476 | 864 | (1, 1, 98) | 4 | 515 ms |
|  | 1815 | 3456 | (1, 1, 98) | 4 | 0 m 03 s |
|  | 7085 | 13824 | (1, 1, 98) | 5 | 1 m 03 s |

Figure 13:
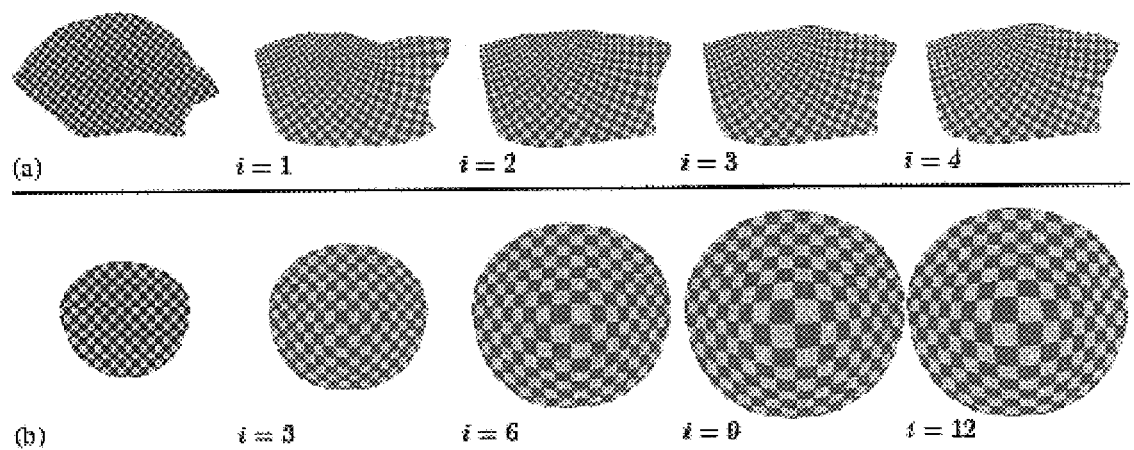
FIG. 13 illustrates a sequence of deformations generated by the global energy minimization algorithm, shown here acting on a grid in the parameter domain for (a) the stamped mechanical part and (b) the mannequin in accordance with one or more embodiments of the invention.

We can take a closer look at this process by inspecting the intermediate parameterizations that are generated during the minimization. Due to the invariants of our algorithm, these parameterizations are guaranteed to be admissible. FIG. 13 depicts the intermediate deformations acting on a rectilinear grid in the initial parameter domain $\omega$. In this regard, FIG. 13 illustrates a sequence of deformations generated by the global energy minimization algorithm, shown here acting on a grid in the parameter domain for (a) the stamped mechanical part and (b) the mannequin.

Notice that much of the optimization is involved in improving the area distortion of the initial parameterizations. Since solutions of the natural conformal parameterization do not have direct control over the area factor, this result is not surprising. The final, optimal deformation is a Moebius transformation since the conformality of the parameterization is preserved under this mapping.

The overall performance of our implementation is summarized in Table 1. Performance figures were recorded on a 2 GHz Pentium IV processor. For each example, an initial quasi-conformal parameterization is optimized according to the energy defined by $\alpha$ (shown as percentile values of 1). In all of our tests, the global energy minimization algorithm converges in relatively few iterations. More iterations are typically required when the initial parameterization is significantly more distorted than the optimal parameterization.

Convergence of the Continuation Method

The energy landscape that expresses the relationship between the initial parameterization and the optimal parameterization can be very complex: since the parameterization energy is polyconvex, it contains many local minima. Global optimization methods perform quite well when the initial parameterization is sufficiently close to the optimal solution, but they can quickly break down if a global minimum is nowhere in sight.

Continuation methods provide a strategy to gradually change the energy landscape allowing one to transform the optimal parameterization for one set of parameters $\alpha_0$ to the solution for a second parameter set $\alpha_1$. Our strategy is quite naive: after finding the optimal parameterization for the energy corresponding to parameters $\alpha_0$, we use this solution as the initial parameterization for the optimization of the energy defined by $\alpha_1$.

Table 2 lists the number of iterations and the execution time for the optimization of $E[\phi]|_{\alpha_1}$, a starting from a parameterization $\tilde{\phi}$ that minimizes $E[\cdot]|_{\alpha_0}$.

TABLE 2

| M | $\alpha_0$ | $\alpha_1$ | Iterations | Time |
|---|---|---|---|---|
| igea | (0.5, 0.5, 99) | (33.3, 33.3, 33.3) | 6 | 0 m 54 s |
| maxplanck | (1, 1, 98) | (33.3, 33.3, 33.3) | 16 | 3 m 56 s |
| sphere | (0.5, 0.5, 99) | (99, 0.5, 0.5) | 7 | 0 m 25 s |
| mannequin | (0.5, 0.5, 99) | (3, 3, 94) | 10 | 0 m 10 s |
|  | (90, 5, 5) | (20, 20, 60) | 12 | 0 m 12 s |
|  | (60, 20, 20) | (33.3, 33.3. 33.3) | 5 | 0 m 05 s |

In Table 2, performance figures for optimal parameterizations obtained using the continuation method. The iterations refer to the steps taken in the energy minimization of $E[\cdot]|_{\alpha_1}$, starting from an initial parameterization that minimizes $E[\cdot]|_{\alpha_0}$. Although our continuation method is simple, it proves to be entirely effective. One can often take large steps between $\alpha_0$ and $\alpha_1$ in the continuation method when the initial parameterization minimizes $E[\cdot]|_{\alpha_0}$. In practice, smaller steps must be taken when a large deformation is needed to obtain an optimal parameterization. This is most noticeable when one of the three energy terms ($\alpha_l$, $\alpha_a$, $\alpha_c$) dominates the others (e.g., the mannequin, Table 2). This issue is exaggerated when one desires an area-preserving parameterization, as these solutions often come at the price of large shear deformations that hinder numerical performance.

Robustness to Surface Discretization

Figure 14:
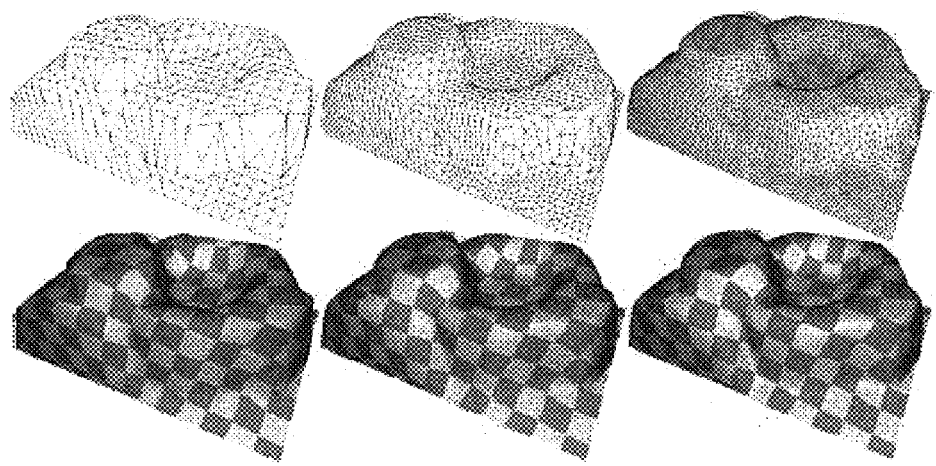
FIG. 14 illustrates successive refinement of a triangulation in accordance with one or more embodiments of the invention.

The continuous energy model that we use has several distinct advantages. Since our energy is defined in the continuous setting, the solution to the minimization problem is insensitive to the particular discretization of the surface. This fact can be observed because different discretizations minimize consistent approximations of the same continuous energy functional. In FIG. 14, we consider the successive refinement of a triangular grid that represents a stamped mechanical part. FIG. 14 illustrates successive refinement of a triangulation demonstrates the stability of the parameterization, due to the fact that the different discretizations minimize consistent approximations of the same continuous energy functional. Notice how the parameterization converges rapidly, and its main features are apparent even at the coarsest resolution. Not surprisingly, the number of Newton steps taken for each of these examples is nearly identical (see Table 1).

Distortion in Optimal Parameterizations

Figure 15:
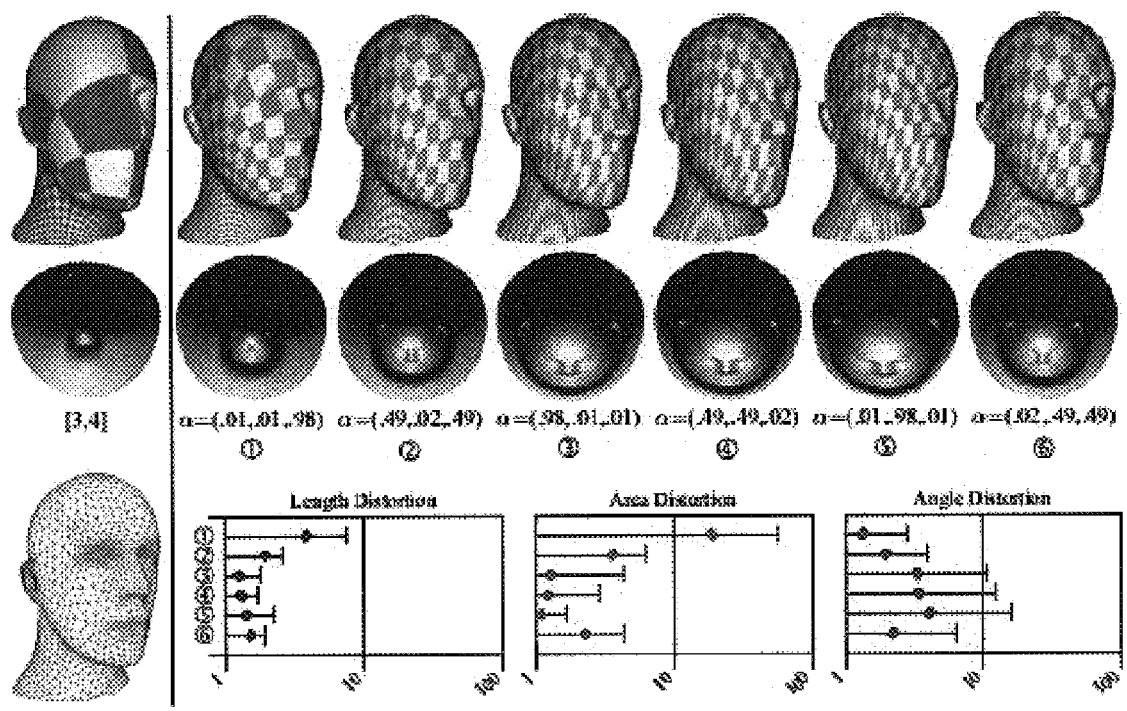
FIG. 15 illustrates the parameterization that is controlled by parameters $\alpha=(\alpha_l, \alpha_a, \alpha_c)$ which capture the trade-off between length, area and angle preservation, respectively in accordance with one or more embodiments of the invention.

FIG. 15 demonstrates our algorithm for a variety of parameter values. In this regard, FIG. 15 illustrates the parameterization that is controlled by parameters $\alpha=(\alpha_l, \alpha_a, \alpha_c)$ which capture the trade-off between length, area and angle preservation, respectively. Texture maps of the initial parameterization on the left and solutions for different parameter settings are shown on top, with the parameter domain beneath. A plot of the maximum, minimum and mean distortion is shown below. Notice that the measured distortion tends to reflect the trade-offs in the choice of parameters.

Figure 16:
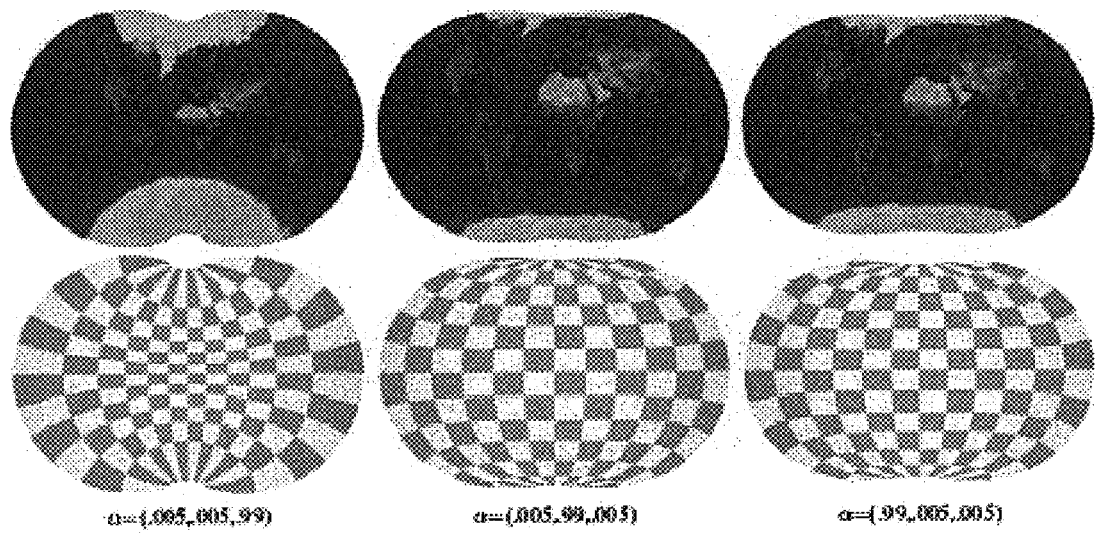
FIG. 16 illustrates the effect of minimizing the different energy terms on parameterizations of a sphere that has been cut in accordance with one or more embodiments of the invention.

Given the initial parameterization on the left, each parameterization on the right is obtained by minimizing the corresponding energy. The relative importance of the three competing parameters $\alpha_l$, $\alpha_a$, $\alpha_c$ is reflected in the distortion of the final parameterization. Recall that distortion can be measured as a function of the maximum and minimum eigenvalues $\delta$, $\gamma$ of the first fundamental form of the parameterization function. We calculate the mean distortion for a parameterization as the arithmetic sum of the contributions from each triangle in our discretization. Popular measures of distortion for angles $\sqrt{\Gamma/\gamma}$, area $\sqrt{\Gamma\gamma}$, and length $\sqrt{\Gamma+\gamma}$ for FIG. 15 are reported in the bottom graphs, where the extreme deformations in the parameterization functions clearly show the trade-offs between the different distortion measures. This correspondence is further explored in FIG. 16, which demonstrates the effect of minimizing the different energy terms on parameterizations of a sphere that has been cut. FIG. 16 illustrates the flattening of the earth. The sphere is opened with a semi-circular cut and its parameterization is optimized for angle, area and length preservation, respectively. Here texture maps show the deformation of the surface in the parameter domain.

Comparison to Related Work

Figure 17:
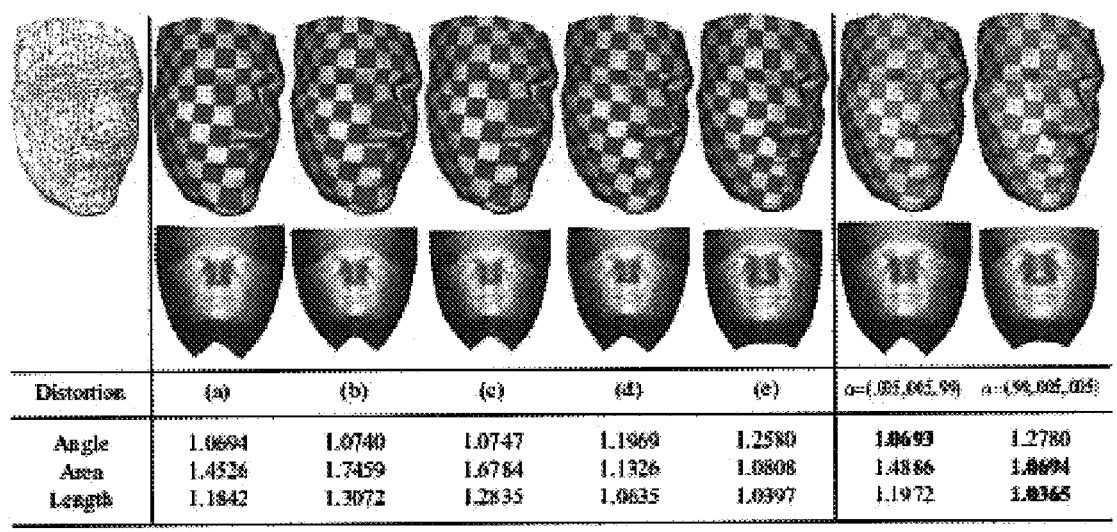
FIG. 17 illustrates a comparison of related work to parameterizations generated in accordance with one or more embodiments of the invention.

We have presented a parameterization method that gives the user flexible control over the trade-off between area, length and angle distortion. FIG. 15 demonstrates this control with examples that range from angle preserving to area preserving, and a comprehensive balance with length distortion in the rest. This contrasts with the prior art, which largely focuses on optimizing for only one measure of distortion, or possibly using linear combinations of energies. FIG. 17 demonstrates that this trade-off is highly effective. In this regard, FIG. 17 illustrates a comparison of related work to parameterizations generated by the present invention. Unlike the prior art, the present invention is not restricted to optimizing for only one notion of distortion, as demonstrated in the table of mean distortion measurements above. The related work considered here includes (a) [15, 29], (b) [46], (c) [25], (d) [14] with $\phi=1$ and (e) [44].

For example, when emphasizing conformality, we achieve a smaller mean distortion than methods which were geared towards the construction of conformal mappings. The same is true for the stretch minimization (note however that we only minimize length distortion with respect the $L^2$ norm, not the $L^\infty$ norm as in [44]). Because of the inherent non-linearity of our method, we find that the discrete conformal mappings which result from linear systems provide us with an excellent starting point for our optimization.

Surface Matching

We continue our investigation of the parameterization algorithms with an analysis of the surface matching method. At the heart of this approach lie the parameterizations generated in the previous section which are rasterized as images of the geometric properties to be matched. Our experiments feature models of faces because of the high variability in detail and the size of features. As well, the degree of scrutiny that we subject them to allows one to be more critical of the correspondences in our examples.

Convergence of the Optimization Algorithm

Figure 18:
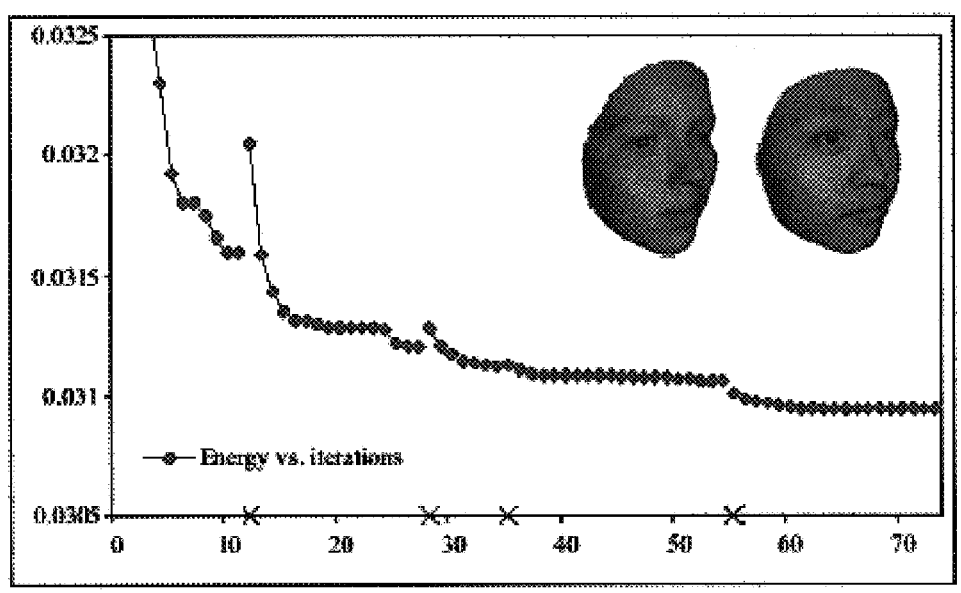
FIG. 18 illustrates a plot of the energy decay for the sequence of deformations computed in the matching energy minimization algorithm on multiple scales in accordance with one or more embodiments of the invention.

To analyze the rate of convergence of the matching algorithm we consider plotting the energy of the system at each iteration of the global minimization algorithm. FIG. 18 shows a representative energy decay which exhibits a characteristic staircase-like behaviour at the change in levels in the multiscale algorithm. One can experience a temporary increase in the energy at these transitional points as more detail is introduced to the refined image. Thus, FIG. 18 illustrates a plot of the energy decay for the sequence of deformations computed in the matching energy minimization algorithm on multiple scales. The staircase-like behaviour results from the jumps onto the next finer scale (marked "x"), which may increase the energy temporarily.

Figure 19:
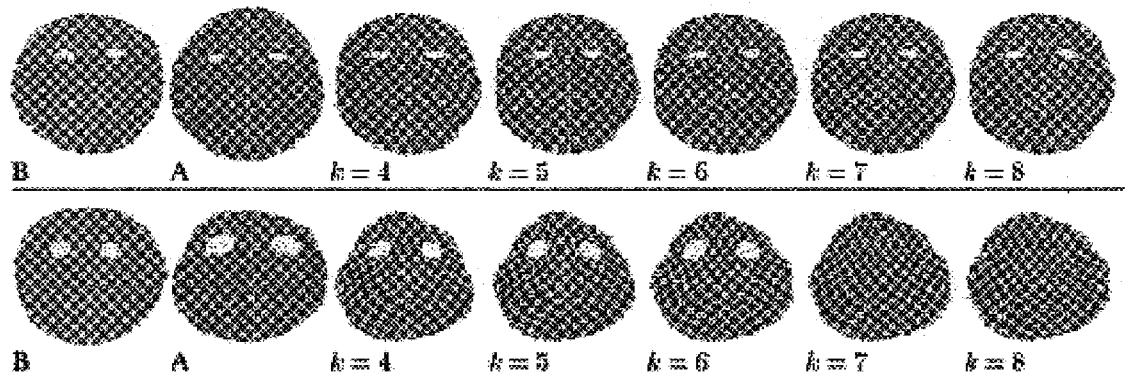
FIG. 19 illustrates the sequence of deformations that are generated my the multiscale optimization algorithm in accordance with one or more embodiments of the invention.

It is also useful to track the progress of the algorithm by analyzing the intermediate deformations in the plane. FIG. 19 illustrates the sequence of deformations that are generated my the multiscale optimization algorithm. For a matching pair A,B, the matching algorithm generates deformations from coarse to fine scales. The feature sets effectively guide the optimization algorithm at coarser scales. At finer scales, features can be removed to match purely by shape (bottom).

The optimal deformations $\tilde{\phi}^k$ that minimize $E^{o,k}[\cdot]$ are guaranteed to be smooth and bijective. Notice how the features serve to guide the match in the coarser stages of the optimization. In the lower example, the feature energy is eliminated at finer scales to allow the match to be optimized based purely on the geometry of the surfaces. This technique is very effective at providing guidance at coarser levels for matches that involve large deformations.

Execution times for our examples are given in Table 3, which lists the matching pairs, the sizes of the triangle meshes, and the number of iterations and computation times for the energy minimization.

TABLE 3

| $M_A$ | $M_B$ | $V_A$ | $V_B$ | Iterations | Time |
|---|---|---|---|---|---|
| lily | lilygrin | 12614 | 13512 | 44 | 0 m 59 s |
| lilygrin | lilysmile | 13512 | 14032 | 59 | 2 m 31 s |
| lily | weiwei | 12614 | 14265 | 65 | 2 m 57 s |
| igea | maxplanck | 14611 | 17755 | 101 | 5 m 45 s |
| armadillo | gargoyle | 84935 | 75914 | 55 | 0 m 17 s |

In Table 3, performance figures are listed for the matching examples ($V_A$, $V_B$ denote # vertices for the triangle meshes $M_A$, $M_B$ respectively). Performance figures were recorded on a 3.6 GHz Intel Pentium IV processor, on which the computation time to generate the geometry images in the examples is negligible. The number of iterations at each level of the multiscale energy minimization algorithm is determined by threshold on the energy decrease (we use a cut-off value of $10^{-6}$ in our experiments). In general we have observed that a larger cut-off gives very similar results in a fraction of the time, since this greatly reduces the number of iterations at the finest levels.

Robustness to Image Discretization

Figure 20:
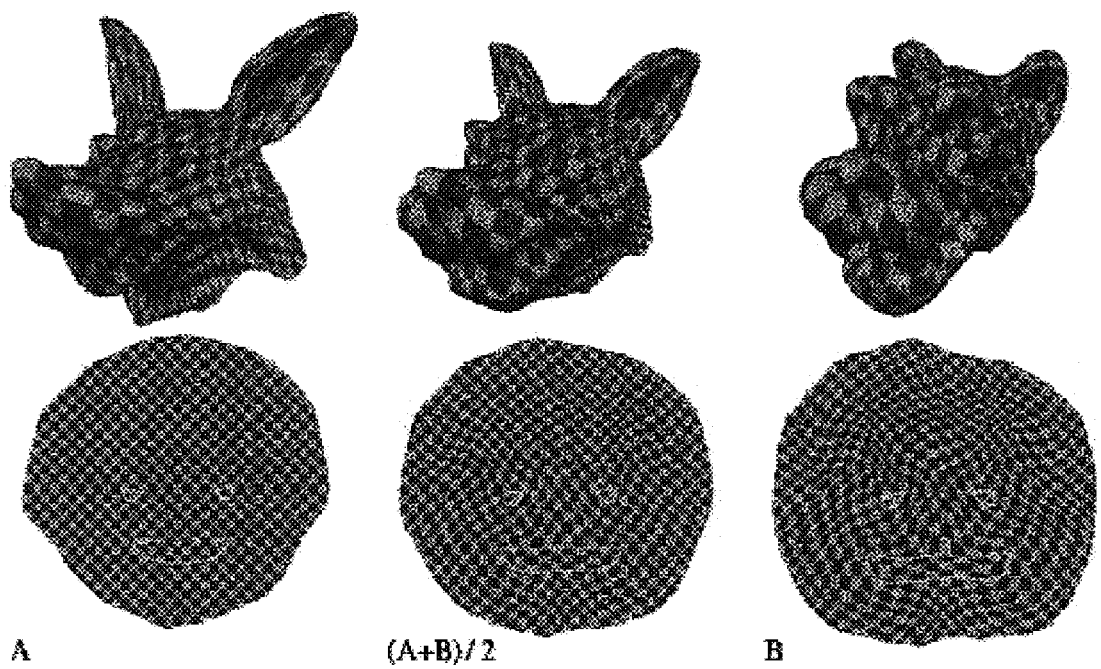
FIG. 20 features a match between two surfaces that have a high degree of distortion in their parameterizations in accordance with one or more embodiments of the invention.

In taking an image processing approach to defining a correspondence between two surfaces, one must be concerned with the discretization of the geometric properties into images. This discretization is controlled by the parameterizations of the surfaces to the plane, and therefore the approximation of the surface properties in the images is subject to the distortion in the parameterizations. FIG. 20 features a match between two surfaces that have a high degree of distortion in their parameterizations. Large deformations are often needed to match surfaces that have very different shapes. A checkerboard is texture mapped onto the first surface as it morphs to the second surface (top). The matching deformation shown in the parameter domain (bottom) is smooth and regular, even where the distortion is high (e.g., around the outlines of the mouth and eyes).

The distortion is balanced according to the algorithm described above, however the shapes of the surfaces nonetheless involve a large area factor in flattening them to the plane. As we illustrate here, our correspondence behaves well despite the large deformation between the surfaces and the distortion in the image domain.

Figure 21:
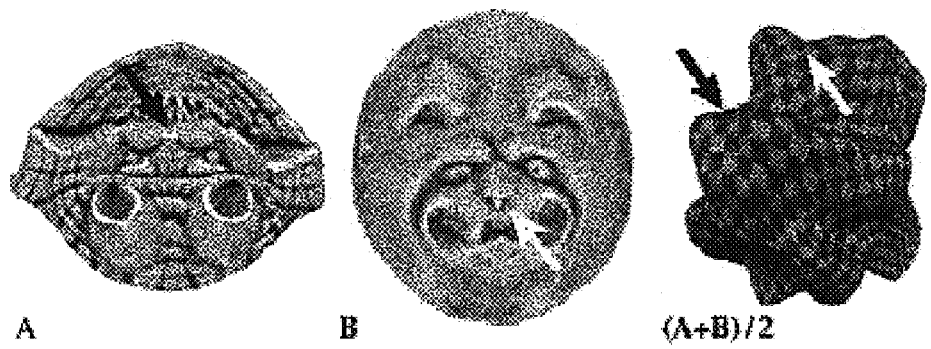
FIG. 21 illustrates a resulting match that is well-behaved in accordance with one or more embodiments of the invention.

In the presence of a gross misalignment of the images, such as a 180° rotation of one of the image domains in FIG. 21, one cannot expect the optimization algorithm to correct the image registration. FIG. 21 illustrates the invention that guarantees that the resulting match is well-behaved, even in the presence of gross misalignments such as the 180 degree rotation of the left image shown here. The 50% morph on the right is smooth and regular (features in the domain are marked with arrows on the surface).

However this example shows that our algorithm robustly computes an optimal deformation that is smooth and free of folds. For illustration purposes, the second model is rotated in the blend to make the marked features more visible.

Partial Correspondence

A difficult challenge for matching disc-like surfaces is the presence of a partial correspondence, where certain regions have no matching counterpart under the correspondence. This is particularly prevalent in boundary regions, where it is actually quite undesirable to define the mapping because no practical correspondence exists.

Figure 22:
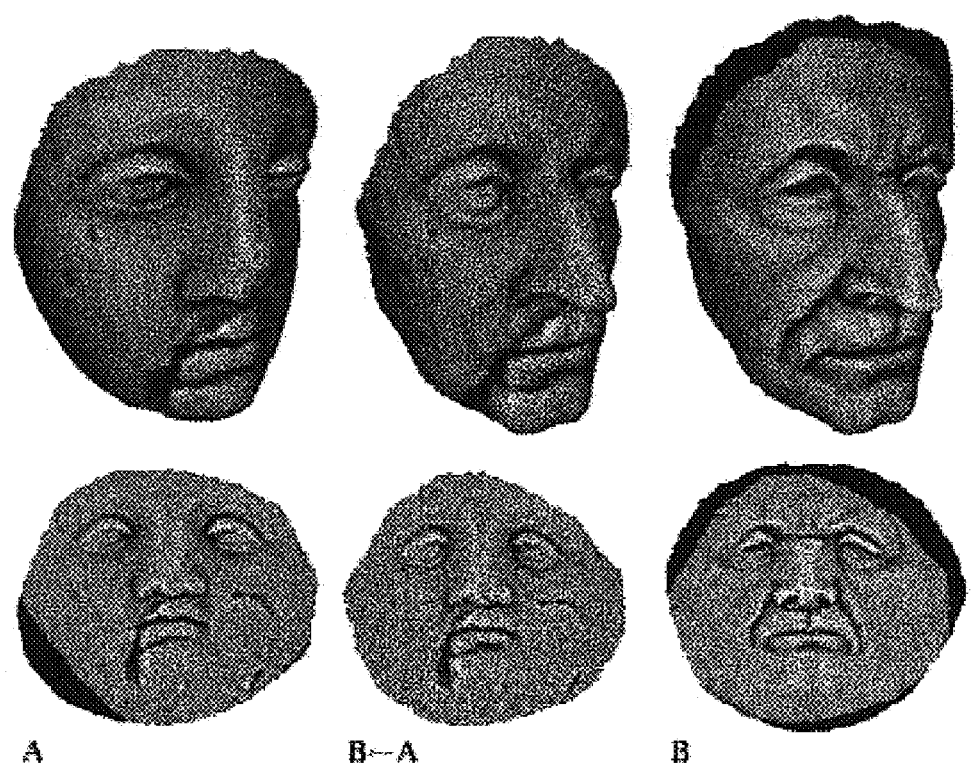
FIG. 22 demonstrates the robust treatment of a partial correspondence in the presence of large deformations in the matching in accordance with one or more embodiments of the invention.

FIG. 22 demonstrates the robust treatment of a partial correspondence in the presence of large deformations in the matching. This example is made even more challenging due to the gross differences in the surfaces and mismatched features. We find that using coarse features as hints and relying on the bending energy for accuracy at finer resolutions is a good strategy in this case. For surfaces with boundaries, a partial correspondence is often desired. In FIG. 22, the correspondence is defined where their parameter domains intersect under the matching deformation (bottom). In this domain, quantities such as texture maps can be mapped between the surfaces (center). The unmatched regions are in black.

Comparison to Related Work

We have presented an approach to surface matching that addresses the problems with robustness and computational efficiency seen in previous methods. One class of algorithms is based on partitioning the surfaces into a common network of parametric domains. This either requires a great deal of user interaction to do the partitioning by hand [28, 43] or involves a difficult algorithm with some user guidance to get a good partitioning [27, 45]. The combinatoric complexity of the meshes determines the performance of these methods, which can be quite costly (on the order of hours). The final matching can only be controlled by changing the parametric domain layout, and it is not clear whether very fine features, for example from texture maps, can be matched with high precision. Our method neither experiences these performance drawbacks nor is the user responsible for manually partitioning the surfaces.

Another class of methods matches a template surface to range scan data directly in 3D [1, 50]. These methods are particularly well suited to matching surfaces when a parameterization cannot easily be computed, such as in the presence of holes. However these algorithms require a manual 3D alignment and the surfaces must be in similar poses to get good results from their matching of normals. In contrast, we can handle large deformations (e.g., FIG. 20) and different poses, and only require a coarse alignment of the parameter domains to get a good match. Unlike previous methods, the smoothness, bijectivity and existence of our solutions is guaranteed. In practice, our matching algorithm robustly computes an optimal deformation that is smooth and free of folds (FIG. 21). It is well known in image matching [20] that uniqueness of solutions cannot be guaranteed, nor is this a normal practical requirement: typically an application does not seek a unique match, but instead desires a smooth correspondence function with a good correlation between salient features. We provide this through the analytic guarantees of our approach and the flexibility afforded to the user to construct good matches.

Applications

With the above described methods in hand, we will now consider some classical applications of surface parameterizations. Common tasks in computer graphics like texture mapping and 3D morphing benefit from the versatility and robustness of our approach. This chapter features non-trivial examples of these applications and also looks at a novel approach to facial animation. These examples are particularly challenging because they use physically-acquired data that have unique problems to overcome.

Texture Mapping

Texture mapping is one of the most venerable applications of parameterizations for triangle meshes. This simple form of surface illustration is accomplished by assigning 2D texture coordinates to the vertices in the mesh. Each triangle is rendered with the pixels of a texture image that lie within its 2D pre-image defined by the coordinates at its vertices. This rudimentary technique nonetheless offers an incredible improvement in the level of detail one can achieve from rendering triangles, and it is an indispensible tool in both low- and high-end computer-generated visual effects.

The central goal and biggest challenge for texture mapping is to achieve high quality (possibly photo-realistic) effects, often on a limited memory budget. This affects the choice of texture coordinates (i.e., the surface parameterization) in two ways. Primarily, the sampling of the image space must provide enough detail for the 3D rendered triangles. One can always guarantee a sufficient sampling rate by increasing the resolution of the image itself, but this is not a practical solution under memory constraints. Therefore to achieve a suitable sampling rate, one desires a parameterization with low distortion, particularly through the control of length [44]. However since an artist often uses image editing software to design the texture image, it is desirable to have low shear distortion by introducing some control over angles. A secondary concern is the appearance of visual artifacts, especially when the surface is animated (e.g., through a time-varying free-form deformation). Kinks and folds in the texture map are unacceptable if one aims to promote the suspension of disbelief. Thus one also requires that the parameterization is smooth and bijective.

Figure 23:
FIG. 23 illustrates photographs of the subject used to generate the texture image in accordance with one or more embodiments of the invention.
Figure 24:
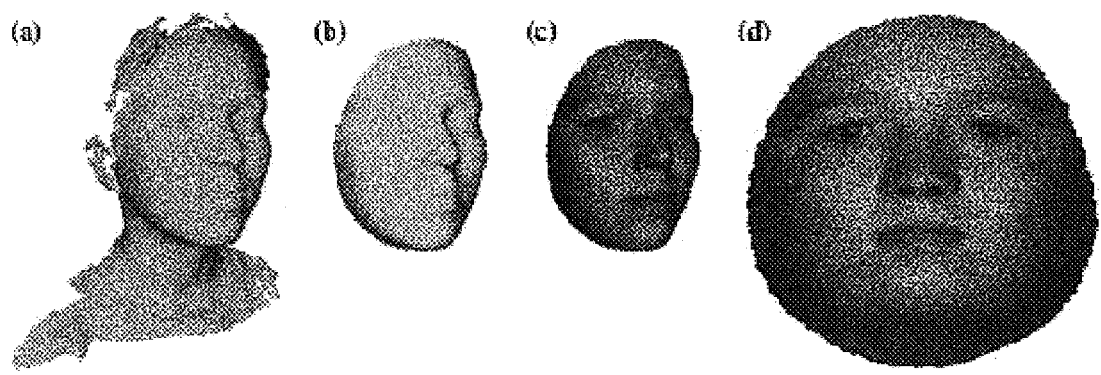
FIG. 24 illustrates texture mapping physically-acquired data: (a) the original triangle mesh; (b) the mesh is smoothed and the face extracted; (c,d) a new texture image is generated in the parameter domain and texture mapped on the face, using a parameterization in accordance with one or more embodiments of the invention.

Our method of surface parameterization is well suited to these challenges, since the texture coordinates that we generate have all of these qualities by construction. The following example is a demonstration of texture mapping that uses 3D facial data captured with structured-light for the geometry acquisition and digital photography for the image acquisition. The data consists of a triangle mesh (FIG. 24(a)) and two color photographs of the subject taken from different angles (FIG. 23). Accordingly, FIG. 23 illustrates photographs of the subject used to generate the texture image, while FIG. 24 illustrates texture mapping physically-acquired data: (a) the original triangle mesh; (b) the mesh is smoothed and the face extracted; (c,d) a new texture image is generated in the parameter domain and texture mapped on the face, using a parameterization constructed with our method.

Texture coordinates are assigned to each triangle in the mesh, corresponding to the appropriate region of the photograph. As is, the data is unsuitable for further processing for the following reasons:

1. The mesh surface is non-manifold and has extraneous data around the boundaries.
2. The triangle mesh is noisy due to low-confidence sample points from the acquisition, particularly at grazing angles and on reflective surfaces such as the eyes.
3. The parameterization is not continuous since the texture map is built from two photographs.

First the mesh is repaired by removing non-manifold artifacts, and then the face is extracted as a manifold subset of the original surface (FIG. 24(b)). To address the second problem, we smooth the surface by displacing the mesh vertices in the normal direction [16]. The resulting surface is fit for texture mapping. We proceed to construct a parameterization of this surface that balances angle, area and length distortion appropriately. Then through this parameterization, a new texture image is generated by rendering the triangles of the original triangle mesh in the new parameter domain (FIG. 24(d)). This image is now ready for final editing and is then applied to the new surface as a texture map (FIG. 24(c)).

3D Morphing

Morphing is a celebrated technique for special effects, famous for "wolf-man" transformations on the silver screen [49]. Simply put, a morph is an animation that transforms one object into another, with the most common subject being human (or human-like) faces. The central element in a morph is the correspondence between the before and after images. In 2D morphing, this correspondence is a map from one image to another, while in 3D one needs a point-wise correspondence between two surfaces. The simplest morphing technique is a linear blend between the objects that is evaluated over time to generate an animation. The quality of the correspondence is critical because any mismatch will be glaringly obvious in the cross-fade between the objects.

Figure 25:
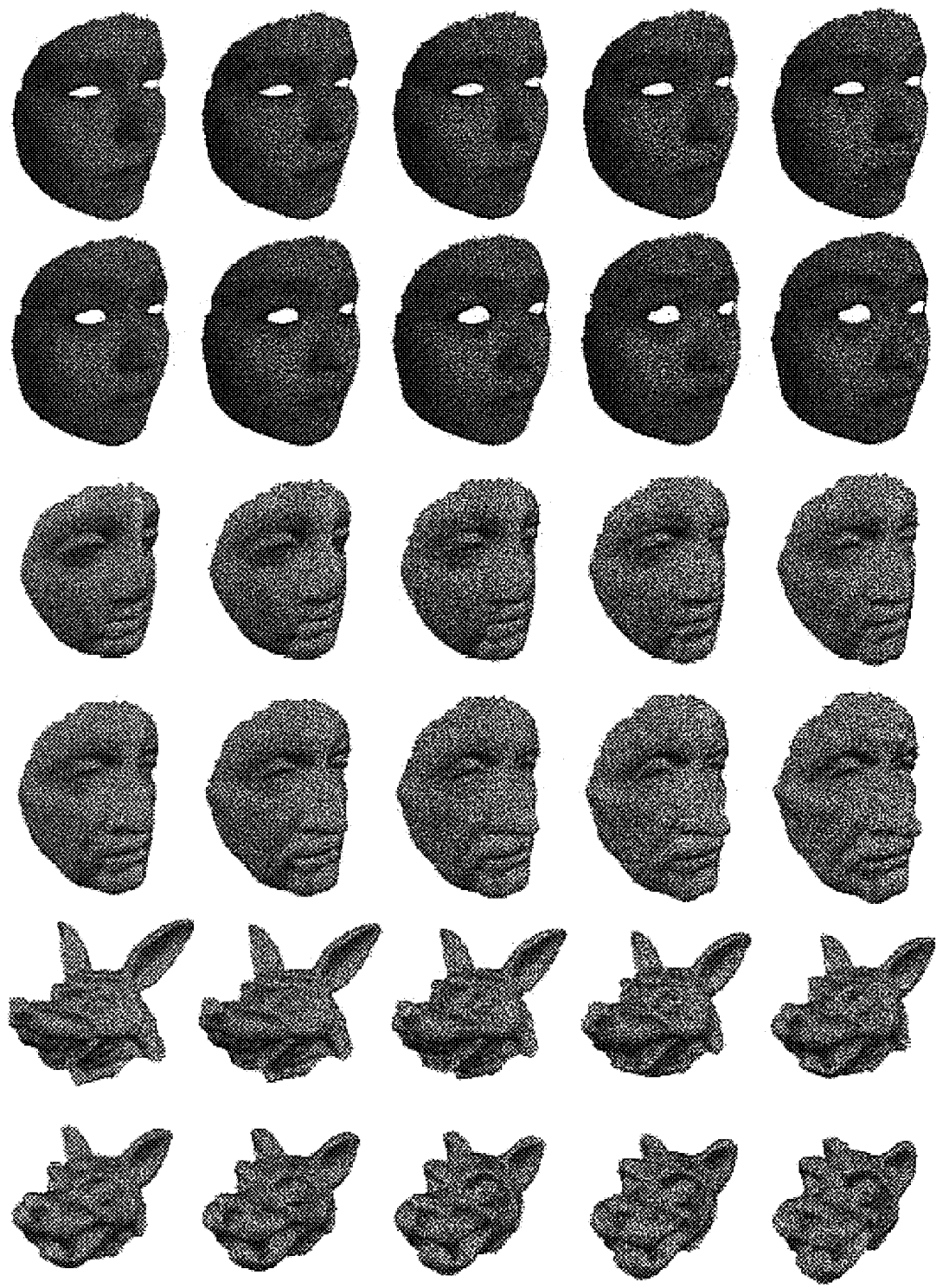
FIG. 25 illustrates examples of 3D morphing as sequences of animation stills in accordance with one or more embodiments of the invention.

Our surface matching method provides an approach to defining a correspondence for 3D morphing. One begins by constructing a correspondence $\phi_M$ for surfaces $M_A$ and $M_B$. Then for each point x on $M_A$, the corresponding point on $M_B$ is given by $$\phi_M(x):=(x_B \circ \phi \circ x_A^{-1})(x)$$

which is defined on $x_A(\omega_A[\phi])$. The morph is then animated over time $t \in [0,1]$ with Examples of 3D morphing are given as sequences of animation stills in FIG. 25. The correspondence between the surface pairs is generated by matching the shape and user-selected features of one surface to the other. Matching faces is particularly challenging because of the incredible degree of scrutiny that they receive. Notice that the salient features are perfectly matched, and the deformation in time is smooth. Both of these qualities are a direct result of the control of shape and feature matching that is inherent in our approach. The high quality of these examples is prohibitively difficult to achieve with other methods, where the correspondences must often be painstakingly generated by hand. In particular, semi-automatic methods typically require the user to specify point constraints that can break the regularity of the deformation, and manually producing consistent mesh representations of the surfaces is both tedious and limited by the resolution of meshes that a human can process. In contrast, the user interaction in our approach is limited to drawing corresponding features on the surfaces. The time to generate a polished morph is about an hour for a user who is familiar with the system, and is typically spent by adding features and rendering an animation sequence, which only takes a few minutes to generate.

Facial Animation

"Blend shapes" is a popular technique for facial animation [41, 42]. In it, multiple key expressions are modeled for the subject. Intermediate expressions are then generated by a linear combination of the key models. Like 3D morphing, this blending requires a consistent parameterization between the keys, and therefore this approach to facial animation has the same challenges. In light of the shortcomings of other 3D morphing techniques, the artist typically resorts to deforming a template mesh into the key expressions by hand, so that the correspondence between the poses is defined implicitly by the mesh structure.

The invention's surface matching technique provides an alternative approach that lifts the user from these restrictions.

Since our correspondence is defined independently from the actual triangulation, we can use high resolution meshes for the key expressions. The only consistency that we require is an identification of the salient features of the face at each key pose, for example the eyes, mouth and lines of symmetry in the face (e.g., FIG. 8).

Figure 26:
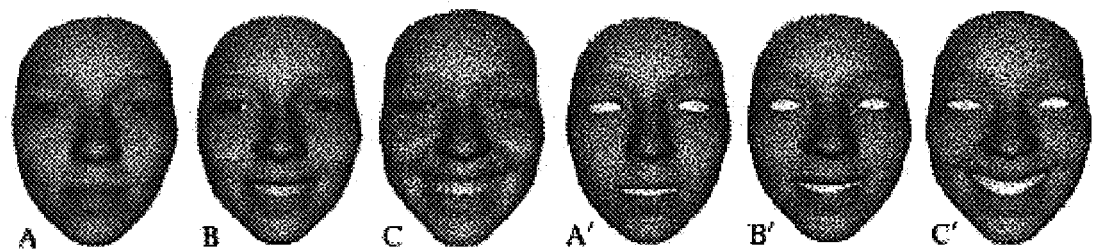
FIG. 26 illustrates morphing through keyframe poses accomplished through pair-wise matches in accordance with one or more embodiments of the invention.

FIG. 26 shows an example of a proof-of-concept implementation of this technique. Further, FIG. 26 illustrates morphing through keyframe poses A, B, C that is accomplished through pair-wise matches A→B and B→C. Starting with A we blend its shape into B using A→B, and then morph to C by applying A→B followed by B→C. The texture from A is used throughout. Because of the close similarity in the poses, one can expect the intermediate blends A', B', C' to correspond very well with the original keyframes A, B, C respectively. Here the goal is to produce a continuous animation sequence by realistically blending between three keyframe poses of the same subject. This is particularly challenging, due to the presence of features that are either rigid or highly deformable (i.e. the eyes and mouth, respectively). We mask out these "holes" with features in order to match their boundaries precisely. The animation has two segments, one which morphs between $M_A$, $M_B$ and the other between $M_B$, $M_C$. We begin by matching the surfaces pairwise to get $\phi_{AB}$ and $\phi_{BC}$. Then we use $\phi_{AB}$ to morph between $M_A$ and $M_B$ in the first segment, and in the second segment we apply the composition $\phi_{BC} \circ \phi_{AB}$ to blend $\phi_{AB}(M_A)$ with $M_C$, thus guaranteeing a seamless transition.

Figure 27:
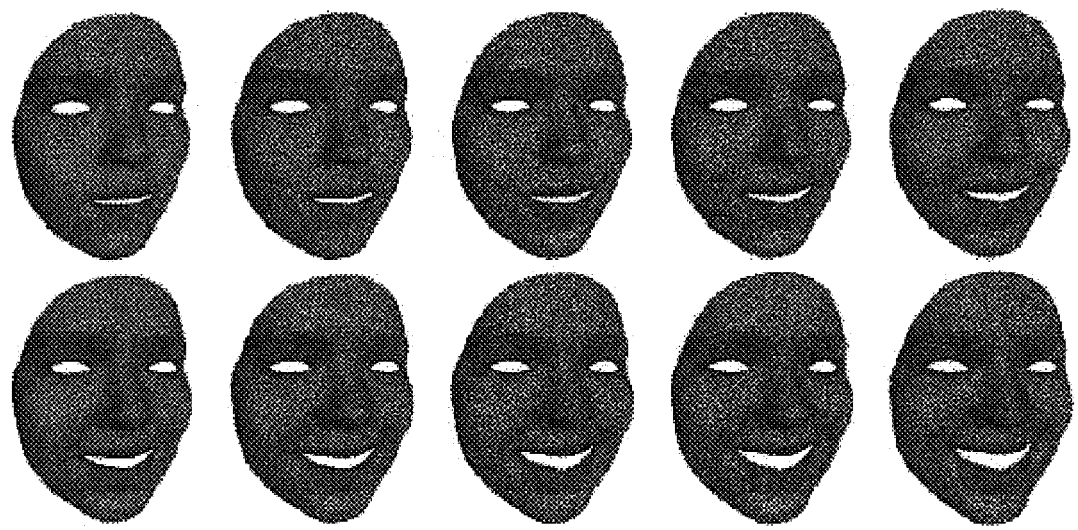
FIG. 27 illustrates a sequence of animation stills that shows facial animation using blend shapes.

A sequence of animation stills is shown in FIG. 27 that shows facial animation using blend shapes. The initial surface and texture is animated through three key expressions that were generated from 3D scans of the same subject. The eyes and mouth are masked out because unlike the skin, they do not undergo elastic deformations. The same mesh can be used throughout the animation in order to save on memory resources in the application. More key expressions can be easily added by matching to a similar key model and remeshing it with the template structure (typically the neutral expression) using an extension of our 3D morphing technique. In this scenario, selective regions of the key poses are typically given different blending ratios to compose more complicated expressions.

Hardware Environment

Figure 28:
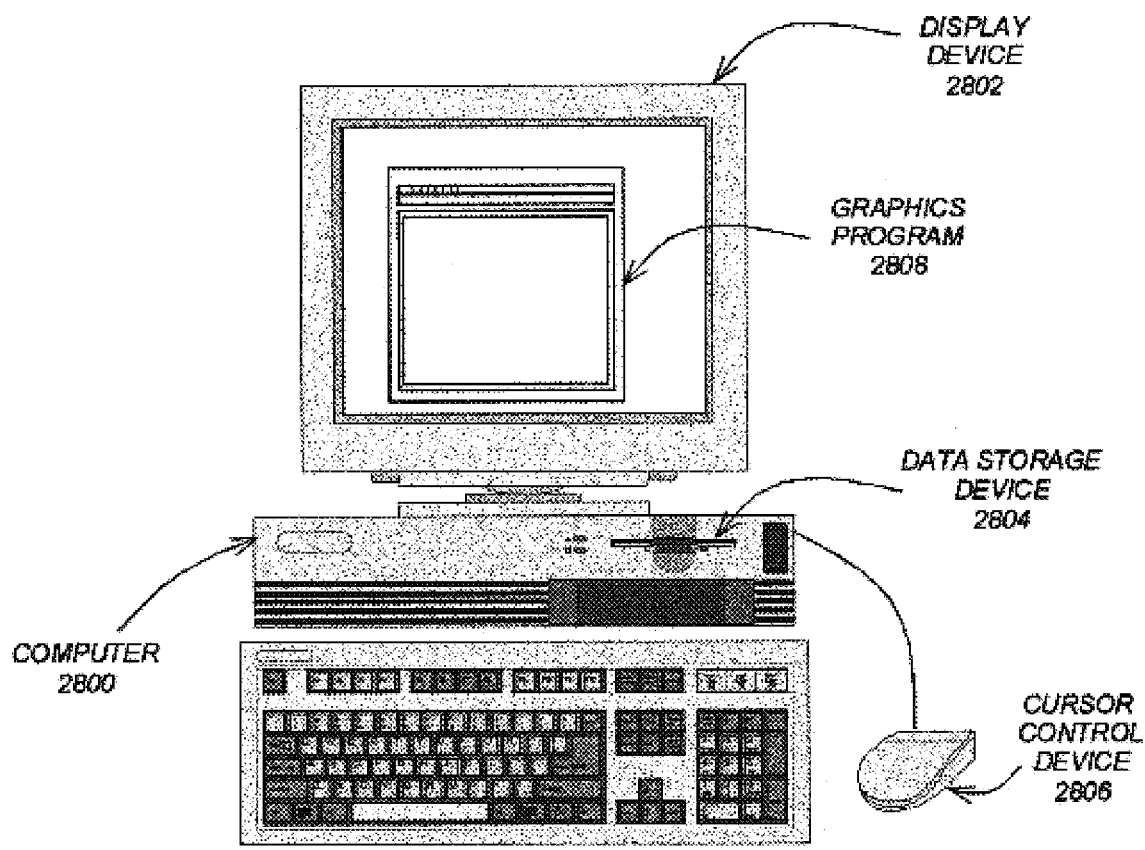
FIG. 28 is an exemplary hardware and software environment used to implement one or more embodiments of the invention.

FIG. 28 is an exemplary hardware and software environment used to implement one or more embodiments of the invention. Embodiments of the invention are typically implemented using a computer 2800, which generally includes, inter alia, a display device 2802, data storage devices 2804, cursor control devices 2806, and other devices. Those skilled in the art will recognize that any combination of the above components, or any number of different components, peripherals, and other devices, may be used with the computer 2800.

One or more embodiments of the invention are implemented by a computer-implemented graphics program 2808, wherein the graphics program 2808 is represented by a window displayed on the display device 2802. Generally, the graphics program 2808 may be an article of manufacture comprising a program storage medium that is readable by a computer. Such a program storage medium tangibly embodies logic and/or data that is embodied in or readable from a device e.g., one or more fixed and/or removable data storage devices 2804 connected directly or indirectly to the computer 2800, one or more remote devices coupled to the computer 2800 via a data communications device, etc.

Those skilled in the art will recognize that the exemplary environment illustrated in FIG. 28 is not intended to limit the present invention. Indeed, those skilled in the art will recognize that other alternative environments may be used without departing from the scope of the present invention.

Logical Flow

Figure 29:
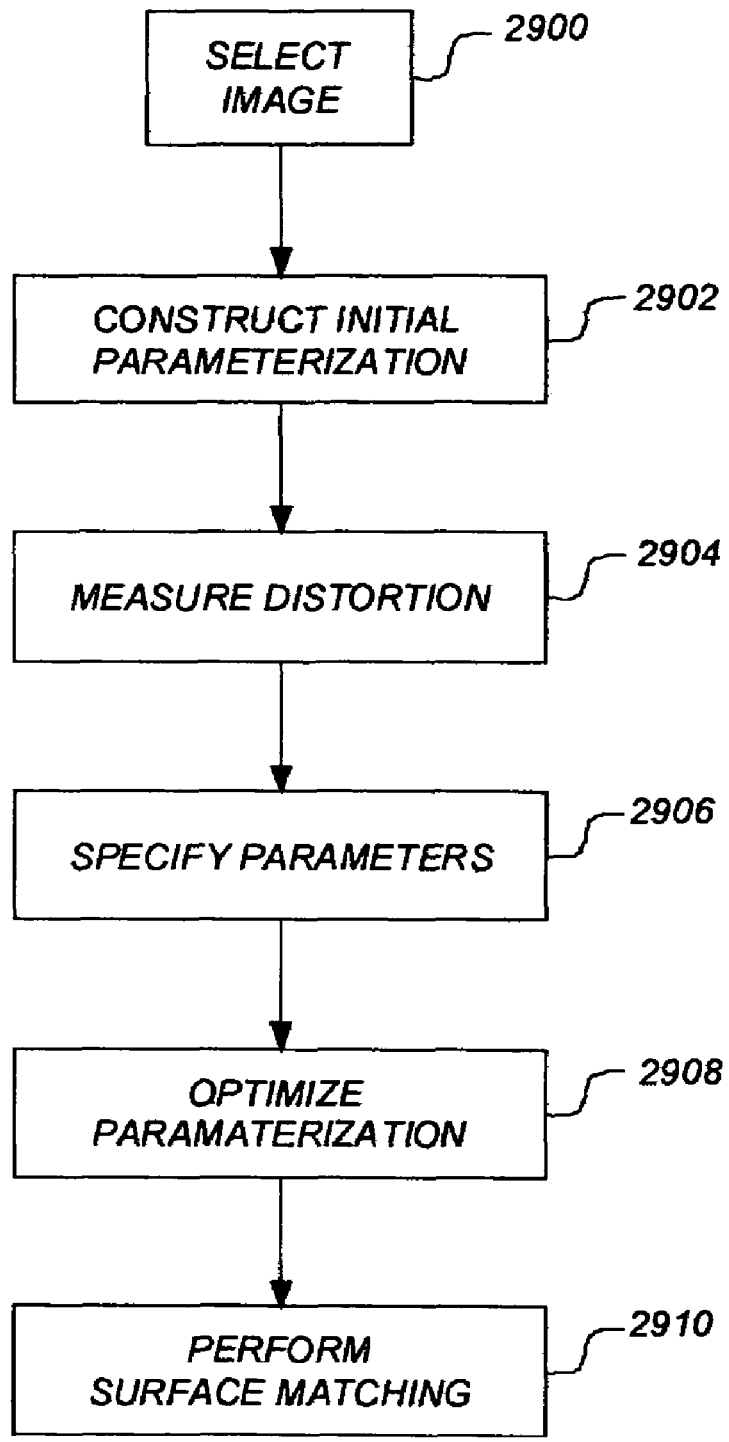
FIG. 29 illustrates the logical flow for implementing a surface parameterization method in accordance with one or more embodiments of the invention.

FIG. 29 illustrates the logical flow for implementing a surface parameterization method in accordance with one or more embodiments of the invention. At step 2900, a 3D image having a surface is selected.

At step 2902, an initial parameterization of the surface onto a 2D plane is constructed. Such an initial parameterization may utilize a parameterization from the prior art. However, the initial parameterization should have natural boundary conditions over a constrained boundary and must be valid wherein an inverse of the initial parameterization does not allow the surface to fold onto itself.

At step 2904, the distortion of the initial parameterization is measured. The distortion may comprise W, such that $$W(a, d) = \alpha_l a + \alpha_a \left(d + \left(\frac{\alpha_l}{\alpha_a} + 1\right)d^{-1}\right) + \alpha_c(a^2/d - 4),$$

wherein $\alpha$ comprises a length control, d comprises an area control, and $\alpha^2/d-4$ comprises a conformality control.

At step 2906, a length parameter $\alpha_l$, an area parameter $\alpha_a$, and an angle parameter $\alpha_c$ are specified. Such a specifying of parameters may be performed by a user.

At step 2908, the initial parameterization is optimized through a discrete deformation of a parameter domain (i.e., a domain contain the length, area, and angle parameters) that minimizes the distortion (i.e., based on the length, area, and angle parameters). Such an optimization iteratively computes a search direction, calculates a step size, and updates the optimal deformation until a minimum distortion has been reached based on the $\alpha_l$, $\alpha_a$, $\alpha_c$, parameters. In this regard, based on the user specified parameter values, the system will calculate the distortion and push the various points/mappings of the parameterization in 2D until a minimum distortion is reached. Such a minimum distortion may be determined based on a numerical optimization wherein the gradient/slope of the distortion value approaches 0.

Step 2910 provides for performing surface matching in accordance with one or more embodiments of the invention. Such surface matching first (optionally) selects matching features on two three dimensional surfaces. Such a selection may comprise drawing lines and marking features as illustrated in FIG. 8 above. The strength and ability to distort a particular feature may also be specified. For example, the various β values may vary across the different features.

A metric and mean curvature may then be evaluated by scan converting the surface triangulation in the parameter domain. An example of the result of such a scan converting is illustrated in FIG. 7 wherein the metric is illustrated in the middle RGB faces and the mean curvature is illustrated by the grey faces. In this regard, the metric provides how the surface is deformed and the mean curvature provides how the surface is curved. In this regard, the mean curvature may be identified as h and the bending energy or distortion of the curvature can be defined as $$E_{bend}[\phi] = \int_{\omega_A} (h_B \circ \phi - h_A)^2 \sqrt{\det g_A} \, d\xi \qquad (2.9)$$

A finite element discretization may then be applied to determinine the energy for a particular feature. Lastly, the discretization is optimized using a multiscale approach to minimize the energy $E^\epsilon[\phi]$ in accordance with $E^\epsilon[\phi] = \beta_{bend}$ $E_{bend}^\epsilon[\phi] + \beta_{reg} E_{reg}[\phi] + \beta_F E_F^\epsilon[\phi]$, wherein $\beta_{bend}$, $\beta_{reg}$, and $\beta_F$ are a bending energy, a feature energy, and a regularization energy that are each user controlled parameters.

Appendix

Surface Parameterization

Representation of the Parameterization Energy

Theorem A.1 (Representation of the energy) Let M be a smooth surface patch, which is parameterized by an initial parameterization x over a set $\omega \subset \mathbb{R}^2$. Under the assumptions of elasticity (2.1), frame indifference (2.2) and isotropy (2.3), there exists a function $W: \mathbb{R}^2 \to \mathbb{R}$ such that $W_M(D\phi \circ x^{-1})(x)) = W(\iota_{C[\phi]})\sqrt{\det g}$ where $\iota_A = (tr(A), det(A))$ are the two principal invariants of $A \in \mathbb{R}^{2,2}$ and the Cauchy-Green strain tensor is defined by $C[\phi] = D\phi g^{-1} D\phi^T.$ Furthermore, the expression $g \in \mathbb{R}^{2,2}$ is the metric tensor w.r.t. the parameterization x, i.e., $g = Dx^T Dx$. Thus, the parameterization energy can be written as $E[\phi] = \int_\omega W((tr(C[\phi]), det(C[\phi])))\sqrt{\det g} d\xi.$ Proof: Due to our assumptions, $g^{-1}$ is symmetric, uniformly positive definite and uniformly bounded. Suppose A is an arbitrary invertible matrix in $\mathbb{R}^{2,2}$. By the polar decomposition theorem there exists an orthogonal matrix Q such that $A = QU$ where $U = (A^T A)^{1/2}$ is symmetric and positive definite.

Hence, by the assumption of frame indifference (2.2) we obtain $\hat{W}(A) = \hat{W}(QU) = \hat{W}(U) = \hat{W}((A^T A)^{1/2})$ Next, we define $\tilde{W}(C) := \hat{W}(C^{1/2})$ for all symmetric, positive definite matrices C and Obtain $\hat{W}(A) = \tilde{W}(A^T A)$ For this and the assumption of isotrophy (2.3) one deduces $\tilde{W}(A^T A) = \hat{W}(A) = \hat{W}(AQ) = \tilde{W}(Q^T A^T AQ)$ for all g-orthogonal matrices Q. In particular, for symmetric, positive definite matrices C we get $\tilde{W}(C) = \tilde{W}(Q^T CQ)$ (A.1)

Next we show that whenever $\iota_{g^{-1}A} = \iota_{g^{-1}B}$ for symmetric, positive definite matrices A, B $\in \mathbb{R}^{2,2}$, then $\tilde{W}(A) = \tilde{W}(B)$. Thus, we immediately deduce that there is a function W such that $\tilde{W}(A) = W(\iota_{g^{-1}A})$ and hence for general matrices $A \in \mathbb{R}^{2,2}$, $\hat{W}(A) = \tilde{W}(A^T A) = W(\iota_{g^{-1}A^T A})$ which is the assertion in our theorem.

First, we observe that for any symmetric matrix A, the matrix $g^{-1} A$ is g-self adjoint. Indeed, $(g^{-1} A)^* = g^{-1} A^T g^{-1} g = g^{-1} A$. Thus, we deduce that $g^{-1} A$ and $g^{-1} B$ diagonalize with respect to the scalar product "·g" and we obtain $g^{-1}A = \lambda_1 r_1(g r_1)^T + \lambda_2 r_2(g r_2)^T$ $g^{-1}B = \mu_1 s_1(g s_1)^T + \mu_2 s_2(g s_2)^T$ with $g r_i \cdot r_j = \delta_{ij}$ and $g s_i \cdot s_j = \delta_{ij}$. Due to our assumption $\iota_{g^{-1}A} = \iota_{g^{-1}B}$ we achieve $\mu_i = \lambda_i$ after a possible reordering. Furthermore, there exists a g-orthogonal matrix Q with $Q s_i = r_i$. Thus we get $A = gg^{-1}A = \sum_{i=1,2} \lambda_i g Q s_i (gQs_i)^T$ $= \sum_{i=1,2} \lambda_i g Q s_i s_i^T Q^T g$ $= \sum_{i=1,2} \lambda_i Q^{-T} g s_i s_i^T g Q^{-1}$ $= Q^{-T} g \sum_{i=1,2} \lambda_i s_i (gs_i)^T Q^{-1}$ $= Q^{-T} g g^{-1} B Q^{-1}$ $= Q^{-T} B Q^{-1}$ Here we have used the fact that $gQ^{-1} = Q^T g$ holds for g-orthogonal matrices Q and that $Q^{-1}$ is g-orthogonal if Q is g-orthogonal, which implies $gQ = g(Q^{-1})^{-1} = Q^{-T} g$. Now, (A.1) applied to the g-orthogonal matrix $Q^{-1}$ leads to $\overline{W}(A) = \overline{W}(Q^{-T} B Q^{-1}) = \overline{W}(B)$, which is what we have claimed above. Finally, we obtain for the principal invariants $tr(g^{-1} D\phi^T D\phi) = tr(D\phi g^{-1} D\phi^T),$ $det(g^{-1} D\phi^T D\phi) = (det g)^{-1} (det D\phi)^2.$ Lemma A.2: Suppose M is a smooth surface, and x is an initial parameterization of M over a set $\omega \subset \mathbb{R}^2$. A deformation $\phi$ which turns the parameterization $x[\phi]$ into an isometry is a local minimizer of the elastic energy $E[\cdot]$ with the density defined in (2.5) if $\alpha_l > 0, \alpha_a > 0, \alpha_c \geq 0$ Proof: Let us take derivatives of the energy integrand W with respect to the inverse metric $q = Ag^{-1} A^T$ in the direction of an arbitrary symmetric matrix $C \in \mathbb{R}^{2,2}$:

$\partial_q W(\iota_q)(C) = \alpha_l tr(C) + \alpha_a \left( \det q - \left(\frac{\alpha_l}{\alpha_a} + 1\right)(\det q)^{-1}\right) tr(q^{-1} C) +$ $\alpha_c \left( 2 \frac{tr(q)}{\det(q)} tr(C) - \frac{tr(q)^2}{\det(q)} tr(q^{-1} C) \right),$ $\partial_q^2 W(\iota_q)(C, C) = \alpha_a \left( \det q + \left(\frac{\alpha_l}{\alpha_a} + 1\right)(\det q)^{-1}\right) tr(q^{-1} C)^2 +$ $\alpha_a \left( \left(\frac{\alpha_l}{\alpha_a} + 1\right)(\det q)^{-1} - \det q\right) tr(q^{-1} C q^{-1} C) +$ $\alpha_c \left( 2 \frac{tr(C)^2}{\det(q)} - 2 \frac{tr(q)tr(C)tr(q^{-1}C)}{\det(q)} + \right.$ $\left. \frac{tr(q)^2}{\det(q)} tr(q^{-1} C)^2 + \frac{tr(q)^2}{\det(q)} tr(q^{-1} C q^{-1} C) \right)$ One can verify that $q = 1I$ is a local extremum of $W(\iota_q)$. Under our usual assumptions every diffeomorphism $\phi: \omega \to \phi(\omega)$ induces a positive definite inverse metric $q = g^{-1}[\phi]$. Hence, $q = 1I$ is a local minimizer of $W(\iota_q)$ if $\partial_q^2 W(\iota_{1I})$ is positive definite. This leads to $\partial_q^2 W(\iota_{1I})(C, C) = (\alpha_l + 2\alpha_a) tr(C)^2 + \alpha_l tr(C^2) + 6\alpha_c tr(C)^2 > 0$ for all symmetric matrices $C \neq 0$. Here we have used the fact that $tr(C^2) > 0$ for any symmetric matrix C with $C \neq 0$, and we have taken into account that $\partial_q W(\iota_{1I})(C)$ to obtain the inequality. It follows that the inequality holds if (2.6) is satisfied.

Existence of Optimal Parameterizations

Theorem A.3 (Existence of an Optimal Parameterization) Let M be a smooth surface patch, which is parameterized by an initial parameterization x over a set $\omega \subset \mathbb{R}^2$. Furthermore, consider the energy in (2.5) over a set of admissible deformations $\phi$, which are continuous and locally bijective. Then for parameters $\alpha_l$, $\alpha_a$, $\alpha_c$ which satisfy (2.6), there exists an admissible, minimizing deformation $\bar{\phi}$.

Proof: Based on a classical result in the calculus of variations the proof is quite straightforward. Let us briefly sketch the main ingredients. We follow the well-known procedure of the direct methods in the calculus of variations [12, 35, 36], in particular the proof of the existence of minimizers for such polyconvex energy functions by Ball [4] (see also the monograph by Ciarlet [9], Theorem 7.7-1). Here, we only give a brief summary of the arguments. From the bi-Lipschitz assumption on the initial parameterization we deduce that $g^{-1} \in L^\infty(\omega)$ and it is uniformly positive definite. Hence, $\sqrt{tr(Ag^{-1}A^T)}$ is actually a norm on linear mappings $A \in \mathbb{R}^{2,2}$.

The growth conditions imply that for every constant C there exists a ball $B_R(0)$ in A with radius R such that $E[\phi] > C$ outside $B_R(0)$. Thus, there exists a minimizing sequence $(\phi^k)$ $\kappa \in \mathbb{N}$ with $\|D\phi^k\|_{L^2(\omega)}$ and $\|\det D\phi^k\|_{L^2(\omega)}$ being uniformly bounded. Due to the constraint on the zero moment and a generalized Poincare inequality, the $H^{1,2}(\omega)$ norm of $\phi^k$ is also uniformly bounded. Because of the reflexivity of $H^{1,2}(\omega) \times L^2(\omega)$ we can extract a weakly convergent subsequence from the minimizing sequence.

Applying well-known results on the weak continuity of the determinant we get that $(\phi^k, \det D\phi^k)$ converges weakly to $((\phi, \det D\phi)$. Furthermore, Ball proved that for the limit deformation $\det D\phi > 0$ holds almost everywhere in $\omega$. Due to the convexity of W in both arguments we finally obtain a result on weak sequentially-lower semicontinuity and thus establish the existence of an admissible, minimizing deformation.

Corollary A.4 (Existence of an Optimal, Area-Preserving Parameterization) Under the assumptions of Theorem A.3, and for the modified set of admissible deformations $\phi$ with $\det g^{-1}[\phi]=1$ there exists a minimizing deformation $\tilde{\phi}$.

Proof: We can reformulate the additional constraint requiring that $\det D\phi = \sqrt{\det g}$. But $\det D\phi$ is weakly continuous on the original set of admissible deformations. Hence the modified admissible set is weakly closed. Thus, we can proceed as in the proof of Theorem A.3. We only have to ensure that there is at least one area preserving, homeomorphic parameterization $x[\bar{\phi}]$ for some deformation $\bar{\phi}$. But the existence of such a parameterization has been established by Moser and Dacorogna [13, 37].

Variations of the Parameterization Energy

The concrete formulas for the derivatives of the energy density $\hat{W}(A) = W(\iota_{Ag^{-1}A^T})$ defined in (2.5) are provided here. The fully discrete $\nabla \bar{E}$ and $\nabla^2 \bar{E}$ are given by $$(\nabla \bar{E})_{ik} = \sum_{T \in \omega_h} |T| \partial_A \hat{W}(A(T))(B^{ik}(T)) \sqrt{\det G(T)},$$

$$(\nabla^2 \bar{E})_{ikjl} = \sum_{T \in \omega_h} |T| \partial_A^2 \hat{W}(A(T))(B^{ik}(T), B^{jl}(T)) \sqrt{\det G(T)},$$

where $A(T) = D\Phi|_T$ as above and $B^{rs}(T) = D\Phi^{rs}|_T$ $$\partial_A \hat{W}(A)(C) = \alpha_l \frac{\partial a}{\partial A}(C) + \alpha_a(1 - \beta d^{-2}) \frac{\partial d}{\partial A}(C) + \alpha_c \left( \frac{2a}{d} \frac{\partial a}{\partial A}(C) - \frac{a^2}{d^2} \frac{\partial d}{\partial A}(C) \right),$$

$$\partial_A^2 \hat{W}(A)(C, H) = \alpha_l \frac{\partial^2 a}{\partial A^2}(C, H) + \beta(2d^{-3}) \frac{\partial d}{\partial A}(C) \frac{\partial d}{\partial A}(H) + \alpha_a(1 - \beta d^{-2}) \frac{\partial^2 d}{\partial A^2}(C, H) + \alpha_c \left( \frac{2a}{d} \frac{\partial^2 a}{\partial A^2}(C, H) + \frac{2}{d} \frac{\partial a}{\partial A}(C) \frac{\partial a}{\partial A}(H) - \frac{2a}{d^2} \frac{\partial a}{\partial A}(C) \frac{\partial d}{\partial A}(H) - \frac{a^2}{d^2} \frac{\partial^2 d}{\partial A^2}(C, H) - \frac{2a}{d^2} \frac{\partial d}{\partial A}(C) \frac{\partial a}{\partial A}(H) + \frac{2a^2}{d^3} \frac{\partial d}{\partial A}(C) \frac{\partial d}{\partial A}(H) \right),$$

and using the fact that $\partial_A(A^{-1})(C) = -A^{-1}CA^{-1}$, $$\frac{\partial a}{\partial A}(C) = 2tr(Ag^{-1}C^T),$$

$$\frac{\partial^2 a}{\partial A^2}(C, H) = 2tr(Hg^{-1}C^T),$$

$$\frac{\partial d}{\partial A}(C) = 2\det^2(A)\det^{-1}(g)tr(A^{-1}C),$$

$$\frac{\partial^2 d}{\partial A^2}(C, H) = 2\det^2(A)\det^{-1}(g)(2tr(A^{-1}C)tr(A^{-1}H) - tr(A^{-1}HA^{-1}C)).$$

Surface Matching

Shape Operators

We define the shape operator $S \in \mathbb{R}^{2,2}$ of the surface M with respect to the parameterization x as the representation of the normal variation in the metric, i.e.

$(gSv) \cdot w = Dnv \cdot Dxw,$ where n is the normal field M. Thus $S_A = g_A^{-1}(Dx_A)^T Dn_A$. For $S_B[\phi]$ at the deformed position $\phi_M(x)$ with respect to the metric $g_A$, we obtain $$(g_A S_B[\phi]v) \cdot w = D(n_B \cdot \phi)v \cdot D(x_B \cdot \phi)w$$
$$= (Dn_B \cdot \phi)D\phi v \cdot (Dx_B \cdot \phi)D\phi w$$

and deduce from this $$S_B[\phi] = g_A^{-1} D\phi^T (Dx_B \cdot \phi)^T (Dn_B \cdot \phi) D\phi$$
$$= g_A^{-1} D\phi^T (g_B \cdot \phi)(S_B \cdot \phi) D\phi,$$

where $S_B$ is the shape operator of the surface $M_B$ taking into account the original metric $g_B$. Up to a factor of $$\frac{1}{2},$$

the average change of the normal variation on the tangent space $T_x M_A$ is given by $$tr(S_B[\phi] - S_A) = tr(g_A^{-1} D\phi^T (g_B \cdot \phi)(S_B \cdot \phi) D\phi - S_A)$$
$$= tr((S_B \cdot \phi) D\phi g_A^{-1} D\phi^T (g_B \cdot \phi) - S_A)$$
$$= tr((S_B \cdot \phi) D\phi G[\phi] D\phi^{-1} - S_A)$$

Let us neglect for the moment the impact of the metric distortion $G[\phi]$ and suppose that $\phi_M$ is an isometry and thus $G[\phi]=1$l. In doing so, we have completely decoupled bending from tangential distortion. Finally, this gives $tr(S_B \circ \phi) - tr(S_A)$ as a local measure for bending.

Variations of the Matching Energy

Here we collect the different contributions of the matching energy in (2.16) and compute variations in directions $\partial$. We deal with an energy $$E[\phi] = \int_\omega \chi^\epsilon I \, d\xi$$

where $X^\epsilon = X_{\omega_A}^\epsilon X_{\omega_B}^\epsilon(\phi)$ is the regularized characteristic function and the actual energy integrand I splits into different contributions $I_{bend} + I_{reg} + I_F$ resulting from the energies $E_{reg}$ (2.7), $E_{bend}$ (2.9) and $\hat{E}_F^\epsilon$ (2.11):

$$I_{bend} := (h_B(\phi) - h_A)^2 \sqrt{\det g_A}$$

$$I_{reg} := W(tr G[\phi]_1 \det G[\phi]) \sqrt{\det g_A}$$

$$I_F := \eta^\epsilon(d_A)\theta^\epsilon(d_B(\phi))\sqrt{\det g_A} + \eta^\epsilon(d_B(\phi))\theta^\epsilon(d_A)\sqrt{\det g_B(\phi)} \det D\phi.$$

The variation of the energy in a direction $\theta$ is given by $$E'[\phi](\partial) := \frac{d}{d\varepsilon} E[\phi + \varepsilon\partial] \Big|_{\varepsilon=0}$$
$$= \int_w (\partial_\phi \chi^\varepsilon \cdot \partial) I + \chi^\varepsilon (\partial_{D\phi} I : D\partial + \partial_\phi I \cdot \partial) \, d\xi,$$

where "·" indicates the Euclidean scalar product and ":" is a scalar product on matrices with $A:B = tr(A^T B)$. Hence, the discrete $L^2$ energy gradient is the vector of these integrals over directional derivatives of the different integrands in directions of the finite element basis on the space of deformations.

Hence, the computation of these derivatives with respect to the arguments $\phi$ and $D\phi$ is a straightforward, albeit involved, application of the chain rule. In particular, for the variation of the regularized characteristic function we obtain $$\theta_\phi X^\varepsilon \cdot \theta = X_{\omega_A}^\epsilon \nabla X_{\omega_B}^\epsilon(\phi) \cdot \theta.$$

for the integrand of the bending energy (which does not depend on $D\phi$)

$$\theta_\phi I_{bend} \cdot \theta = 2(\nabla h_B(\phi) \cdot \theta)(h_B(\phi) - h_A)\sqrt{\det g_A},$$

and for the integrand of the regularization energy (2.8)

$$\partial_\phi I_{reg} \cdot \partial = \left(\alpha_l \partial_\phi \alpha \cdot \partial + \alpha_a \left(1 - \frac{\alpha_a - \alpha_l}{\alpha_a d^2}\right) \partial_\phi d \cdot \partial\right) \sqrt{\det g_A},$$

$$\partial_{D\phi} I_{reg} : D\partial = \left(\alpha_l \partial_{D\phi} \alpha : D\partial + \alpha_a \left(1 - \frac{\alpha_a - \alpha_l}{\alpha_a d^2}\right) \partial_{D\phi} d : D\partial\right) \sqrt{\det g_A},$$

with $$\theta_{D\phi} a : D\theta = 2tr(g_A^{-1} D\phi^T g_B(\phi) D\theta), \theta_\phi a \cdot \theta = tr(g_A^{-1} D\phi^T (\nabla g_B(\phi) \cdot \theta) D\phi),$$

$$\theta_{D\phi} d : D\theta = 2(\det g_A)^{-1} \det g_B(\phi)(\det D\phi)^2 tr(D\phi^{-1} D\theta),$$
$$\theta_\phi d \cdot \theta = (\det g_A)^{-1} \det g_B(\phi)(\det D\phi)^2 \cdot tr(g_B^{-1}(\phi)(\nabla g_B(\phi) \cdot \theta)).$$

Here we define $\nabla g_B(\phi) \cdot \omega \in \mathbb{R}^{2,2}$ by $$(\nabla g_B(\phi) \cdot w)_{ij} = \sum_k \partial_k (g_B)_{ij}(\phi) w_k.$$

Finally, we obtain for the integrand of the feature energy $$\partial_\phi I_F \cdot \partial = \eta^\epsilon(d_A)(\theta^\epsilon)'(d_B(\phi))(\nabla d_B(\phi) \cdot \partial)\sqrt{\det g_A} +$$
$$(\eta^\epsilon)'(d_B(\phi))(\nabla d_B(\phi) \cdot \partial) \theta^\epsilon(d_A) \sqrt{\det g_B(\phi)} \det D\phi +$$
$$\eta^\epsilon(d_B(\phi))\theta^\epsilon(d_A) \frac{tr(g_B^{-1}(\phi)(\nabla g_B(\phi) \cdot w))}{2\sqrt{\det g_B(\phi)}} \det D\phi,$$

$$\partial_{D\phi} I_F : D\partial = \eta^\epsilon(d_B(\phi))\theta^\epsilon(d_A)\sqrt{\det g_B(\phi)} \det D\phi tr(D\phi^{-1} D\partial).$$

REFERENCES

[1] ALLEN, B., CURLESS, B., AND POPOVIC, Z. The space of human body shapes: reconstruction and parameterization from range scans. *ACM Transactions on Graphics* 22, 3 (July 2003), 587-594.

[2] ALVAREZ, L., WEICKERT, J., AND SANCHEZ, J. A scale-space approach to nonlocal optical flow calculations. In *Second International Conference*, Scale-Space '99 (1999), Lecture Notes in Computer Science; 1682, pp. 235-246.

[3] BAJCSY, R., AND BROIT, C. Matching of deformed images. In *Proc. 6th Int. Joint Conf. Pattern Recogn.* (1982), pp. 351-353.

[4] BALL, J. M. Convexity conditions and existence theorems in nonlinear elasiticity. *Arch. Rat. Mech. Anal.* 63 (1977), 337-403.

[5] BLANZ, V., AND VETTER, T. A morphable model for the synthesis of 3D faces. In *Proceedings of SIGGRAPH 99* (1999), Computer Graphics Proceedings, Annual Conference Series, pp. 187-194.

[6] BORNEMANN, F., AND RASCH, C. Finite-element discretization of static Hamilton-Jacobi equations based on a local variational principle. *Preprint*, 2005.

[7] BROWN, L. G. A survey of image registration techniques. *ACM Computing Surveys* 24, 4 (December 1992), 325-376.

[8] CHENG, X. On the nonlinear inexact Uzawa algorithm for saddle-point problems. *SIAM J. Numer. Anal.* 37, 6 (2000), 1930-1934.

[9] CIARLET, P. G. *Three-Dimensional Elasticity*. Elsevier, N.Y., 1988.

[10] CLARENZ, U., LITKE, N., AND RUMPF, M. Axioms and variational problems in surface parameterization. *Computer Aided Geometric Design* 21, 8 (2004), 727-749.

[11] COHEN, I. Nonlinear variational method for optical flow computation. In *Proc. of the Eighth Scandinavian Conference on Image Analysis* (1993), pp. 523-530.

[12] DACOROGNA, B. *Direct Methods in the Calculus of Variations*. Appl. Math. Sciences 78 Springer-Verlag, Berlin, 1989.

[13] DACOROGNA, B., AND MOSER, J. On a partial differential equation involving the Jacobian determinant. *Ann. Inst. H. Poincar'e Anal. Non Lin'eaire* 7, 1 (1990), 1-26.

[14] DEGENER, P., MESETH, J., AND KLEIN, R. An adaptable surface parameterization method. *In Proc. 12th Int. Meshing Roundtable* (October 2003), pp. 201-213.

[15] DESBRUN, M., MEYER, M., AND ALLIEZ, P. Intrinsic parameterizations of surface meshes. *In Eurographics* 2002 (2003), pp. 209-218.

[16] DESBRUN, M., MEYER, M., SCHROEDER, P., AND BARR, A. H. Implicit fairing of irregular meshes using diffusion and curvature flow. In Proceedings of SIGGRAPH 99 (August 1999), Computer Graphics Proceedings, Annual Conference Series, pp. 317-324.

[17] DROSKE, M., LITKE, N., OLISCHLAEGER, N., AND RUMPF, M. Variational methods forsurface matching: Existence and qualitative properties. In preparation, 2005.

[18] DROSKE, M., AND RUMPF, M. A variational approach to non-rigid morphological image matching. SIAM Appl. Math. 64, 2 (2004), 668-687.

[19] FLOATER, M. S., AND HORMANN, K. Surface parameterization: a tutorial and survey. In Advances in Multiresolution for Geometric Modelling. Springer, 2005, pp. 157-186.

[20] GRENANDER, U., AND MILLER, M. I. Computational anatomy: an emerging discipline. Quarterly Appl. Math. LVI, 4 (1998), 617-694.

[21] GRINSPUN, E., HIRANI, A. N., DESBRUN, M., AND SCHROEDER, P. Discrete shells. In 2003 ACM SIGGRAPH/Eurographics Symposium on Computer Animation (August 2003), pp. 62-67.

[22] GU, X., GORTLER, S. J., AND HOPPE, H. Geometry images. ACM Transactions on Graphics 21, 3 (2002), 355-361.

[23] GU, X., AND VEMURI, B. C. Matching 3D shapes using 2D conformal representations. In MICCAI (1) (2004), pp. 771-780.

[24] GU, X., AND YAU, S.-T. Computing conformal structures of surfaces. Communications in Informations and Systems (2002), 121-146.

[25] HORMANN, K., AND GREINER, G. MIPS: An efficient global parametrization method. In Curve and Surface Design: Saint-Malo 1999 (2000), pp. 153-162.

[26] KHAREVYCH, L., SPRINGBORN, B., AND SCHROEDER, P. Discrete conformal mappings via circle patterns. In preparation, 2005.

[27] KRAEVOY, V., AND SHEFFER, A. Cross-parameterization and compatible remeshing of 3D models. ACM Transactions on Graphics 23, 3 (August 2004), 861-869.

[28] LEE, A., DOBKIN, D., SWELDENS, W., AND SCHROEDER, P. Multiresolution mesh morphing. In Proceedings of SIGGRAPH 99 (August 1999), Computer Graphics Proceedings, Annual Conference Series, pp. 343-350.

[29] L'EVY, B., PETITJEAN, S., RAY, N., AND MAILLOT, J. Least squares conformal maps for automatic texture atlas generation. ACM Transactions on Graphics 21, 3 (2002), 362-371.

[30] LITKE, N., CLARENZ, U., RUMPF, M., AND SCHROEDER, P. A variational approach to ptimal parameterization. In preparation, 2005.

[31] LITKE, N., DROSKE, M., RUMPF, M., AND SCHROEDER, P. An image processing approach to surface matching. To appear in the Proceedings of the Symposium on Geometry Processing 2005.

[32] MARSDEN, J. E., AND HUGHES, T. J. R. Mathematical Foundations of Elasticity. Prentice-Hall, Englewood Cliffs, 1983.

[33] MERCAT, C. Discrete Riemann surfaces and the Ising model. Communications in Mathematical Physics 218, 1 (2001), 177-216.

[34] MEYER, M., DESBRUN, M., SCHROEDER, P., AND BARR, A. H. Discrete differential geometry operators for triangulated 2-manifolds. Vis. Math. (2002).

[35] MORREY, C. Quasi-convexity and lower semicontinuity of multiple integrals. Pac. J. Math. 2 (1952), 25-53.

[36] MORREY, C. Multiple Integrals in the Calculus of Variations. Springer-Verlag, New York, 1966.

[37] MOSER, J. On the volume elements on a manifold. Trans. Amer. Math. Soc. 120 (1965), 286-294.

[38] NOCEDAL, J., AND WRIGHT, S. J. Numerical Optimization. Springer Series in Operations Research. Springer-Verlag, New York, 1999.

[39] OGDEN, R. W. Non-Linear Elastic Deformations. John Wiley, 1984.

[40] OSHER, S. J., AND SETHIAN, J. A. Fronts propagating with curvature dependent speed: Algorithms based on Hamilton-Jacobi formulations. J. of Comp. Physics 79 (1988), 12-49.

[41] PARKE, F. I. Computer generated animation of faces. In ACM'72: Proceedings of the ACM annual conference (1972), pp. 451-457.

[42] PARKE, F. I. A parametric model for human faces. PhD thesis, University of Utah, Salt Lake City, Utah, 1974.

[43] PRAUN, E., SWELDENS, W., AND SCHROEDER, P. Consistent mesh parameterizations. In Proceedings of ACM SIGGRAPH 2001 (August 2001), Computer Graphics Proceedings, Annual Conference Series, pp. 179-184.

[44] SANDER, P. V., SNYDER, J., GORTLER, S. J., AND HOPPE, H. Texture mapping progressive meshes. Proceedings of SIGGRAPH 2001 (2001), 409-416.

[45] SCHREINER, J., ASIRVATHAM, A., PRAUN, E., AND HOPPE, H. Inter-surface mapping. ACM Transactions on Graphics 23, 3 (August 2004), 870-877.

[46] SHEFFER, A., AND DE STURLER, E. Parameterization of faceted surfaces for meshing using angle based flattening. Engineering with Computers 17, 3 (2001), 326-337.

[47] SORKINE, O., COHEN-OR, D., GOLDENTHAL, R., AND LISCHINSKI, D. Boundeddistortion piecewise mesh parameterization. In IEEE Visualization (2002), pp. 355-362.

[48] VAN DEN ELSEN, P. A., POL, E.-J. J., AND VIERGEVER, M. A. Medical image matching: A review with classification. IEEE Engineering in Medicine and Biology 12 (1993), 26-39.

[49] WOLBERG, G. Digital Image Warping. IEEE Computer Society Press, Los Alamitos, Calif., 1990.

[50] ZHANG, L., SNAVELY, N., CURLESS, B., AND SEITZ, S. M. Spacetime faces: high resolution capture for modeling and animation. ACM Transactions on Graphics 23, 3 (August 2004), 548-558.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

We have presented two methods of surface parameterization. By deriving our approach from a rigorous variational formulation in the continuous setting, we have guaranteed the quality of our parameterizations and the performance of the algorithms which construct them.

Above, we developed a rigorous variational framework for surface parameterization. We addressed two important classes of parametric mappings, namely, parameterizations over a region of the plane, and correspondences that map between two surfaces. A critical distinguishing trait of our approach is its roots in the classical theory of rational mechanics. From this foundation we are able to bring theoretical guarantees along with our treatment of parameterizations, including proof of the existence of variationally optimal parameterizations.

Subsequent sections described a set of algorithms for constructing parameterizations of triangle meshes. Due to the theoretical underpinnings of variational framework for surface parameterization described, we apply a straightforward finite element method toward the discretization of our parameterization energies over the space of surface triangulations. This leads to flexibility in the design of the energy minimization method, which is chosen from the mature and extensive body of work in numerical optimization. Our implementation provides user control over the parameterization, particularly in the way that distortion is handled.

An analysis of our algorithms was then described. Experimentation focused on range scan data of physical surfaces. The triangle meshes obtained from this process are particularly challenging to parameterize due to the high degree of variability in the shapes of the surfaces and the quality of the discretization. We demonstrated the efficiency of our algorithms through an analysis of the energy minimization and by the fast execution times for our examples. Finally, we showed our methods are robust in a challenging set of examples. In all cases, we generate parameterizations that are smooth, bijective and have low distortion.

Subsequent discussion presented a variety of applications of surface parameterization. First high-quality texture maps were created from range scan data and photographs of the subject's face. These parameterizations were then featured in novel applications of 3D morphing to highlight the versatility of our surface correspondences. Our approach to surface matching is a major contribution to surface parameterizations in its own right, as well as a clever application of our parameterizations in the plane.

Further aspects of the invention may include the parameterizations of higher genus surfaces. Cylindrical, spherical, toroidal and higher genus domains do not embed into the plane and therefore new variational approaches to optimal parameterization may be derived to extend the properties of our planar parameterizations to the arbitrary topology setting. A new approach based on overlapping parametric patches on the surface addresses the instability of high dynamic range parameterizations and has a direct application toward texture mapping in character animation. As the resolution of triangulated surfaces escalates due to high-precision range scan data and next generation modeling tools, the desire to process these surfaces must be met by non-linear multigrid methods on unstructured triangle grids that provide stable and efficient algorithms for parameterization and other variational methods.

The invention may also provide for geodesic curves in deformation space. Given a correspondence between surfaces in a discrete sequence sampled over time, it is natural to ask for an optimal surface deformation which interpolates each surface in turn to achieve a realistic, smooth animation (e.g., facial animation of a live actor or a synthetic character). One may also ask to apply this deformation to an entirely new surface, whereby it must adapt to the shape of the second subject. Both scenarios are related to finding shortest paths in a space of deformations that is described by a time-dependent variational energy. The above description on surface matching provides both a tool for the correspondences and a framework for a deformation energy that measures the variation of shape over time subject to user control over the animation.

In addition, one may provide for free-form deformation of discrete parametric surfaces The practical and theoretical guarantees of the above description on surface parameterization introduces discrete parametric surfaces as a new geometric modeling primitive. Leveraging the mature body of modeling and animation techniques built up through the decades of study of parametric surface patches, one can provide new methods for the free-form deformation of discrete parametric surfaces. Such methods may overcome the limitations of geometric modeling with subdivision surfaces, the de facto standard of modern-day commercial animation, while providing all of its benefits. The challenges of such a contribution may require new methods in surface remeshing, parametric correspondence, and free-form deformation techniques.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for constructing an optimal parameterization for a discrete surface patch, comprising:

selecting a three-dimensional image having a surface displayed by a computer device;

constructing an initial parameterization of the surface onto a two-dimensional plane displayed by the computer device;

measuring a distortion induced by the initial parameterization;

specifying a length parameter $\alpha_l$, an area parameter $\alpha_a$, and an angle parameter $\alpha_c$; and using the computer device for optimizing the initial parameterization through a discrete deformation of a parameter domain that minimizes the distortion of the parameterized surface displayed by the computer device on the two-dimensional plane based on the length, area, and angle parameters.

2. The method of claim 1, wherein the initial parameterization has natural boundary conditions over a constrained boundary.

3. The method of claim 1, wherein the initial parameterization comprises a valid parameterization wherein an inverse of the initial parameterization does not allow the surface to fold onto itself.

4. The method of claim 1, wherein the distortion comprises $$W(a, d) = \alpha_l a + \alpha_a \left(d + \left(\frac{\alpha_l}{\alpha_a} + 1\right)d^{-1}\right) + \alpha_c(a^2/d - 4),$$

wherein $\alpha$ comprises a length control, d comprises an area control, and $\alpha^2/d-4$ comprises a conformality control.

5. The method of claim 1, wherein a user specifies the $\alpha_l$, $\alpha_a$, $\alpha_c$ parameters.

6. The method of claim 1, wherein the optimizing comprises iteratively computing a search direction, calculating a step size, and updating the optimal deformation until a minimum distortion has been reached based on the $\alpha_l$, $\alpha_a$, $\alpha_c$ parameters.

7. The method of claim 1 further comprising:
selecting matching features on two three dimensional surfaces;
evaluating a metric and mean curvature by scan converting a surface triangulation in the parameter domain;
applying a finite element discretization; and
optimizing the discretization using a multiscale approach to minimize an energy of the discretization $E^\epsilon[\phi]$ in accordance with
$E^\epsilon[\phi]=\beta_{bend}E_{bend}^\epsilon[\phi]+\beta_{reg}E_{reg}[\phi]+\beta_F E_F^\epsilon[\phi]$, wherein $\beta_{bend}$, $\beta_{reg}$ and $\beta_F$ are a bending energy, a feature energy, and a regularization energy that are each user controlled parameters.

8. An apparatus for constructing an optimal parameterization for a discrete surface patch in a computer system comprising:
(a) a computer having a memory;
(b) an application executing on the computer, wherein the application is configured to:
(i) select a three-dimensional image having a surface;
(ii) construct an initial parameterization of the surface onto a two-dimensional plane;
(iii) measure a distortion induced by the initial parameterization;
(iv) specify a length parameter $\alpha_l$, an area parameter $\alpha_a$, and an angle parameter $\alpha_c$; and
(v) optimize the initial parameterization through a discrete deformation of a parameter domain that minimizes the distortion of the parameterized surface based on the length, area, and angle parameters.

9. The apparatus of claim 8, wherein the initial parameterization has natural boundary conditions over a constrained boundary.

10. The apparatus of claim 8, wherein the initial parameterization comprises a valid parameterization wherein an inverse of the initial parameterization does not allow the surface to fold onto itself.

11. The apparatus of claim 8, wherein the distortion comprises $$W(a,d) = \alpha_l a + \alpha_a\left(d + \left(\frac{\alpha_l}{\alpha_a} + 1\right)d^{-1}\right) + \alpha_c(a^2/d - 4),$$

wherein a comprises α length control, d comprises an area control, and $\alpha^2/d-4$ comprises a conformality control.

12. The apparatus of claim 8, wherein a user specifies the $\alpha_l$, $\alpha_a$, $\alpha_c$ parameters.

13. The apparatus of claim 8, wherein the application is configured to optimize by iteratively computing a search direction, calculating a step size, and updating the optimal deformation until a minimum distortion has been reached based on the $\alpha_l$, $\alpha_a$, $\alpha_c$ parameters.

14. The apparatus of claim 8, wherein the application is further configured to:
select matching features on two three dimensional surfaces;
evaluate a metric and mean curvature by scan converting a surface triangulation in the parameter domain;
apply a finite element discretization; and
optimize the discretization using a multiscale approach to minimize an energy of the discretization $E^\epsilon[\phi]$ in accordance with
$E^\epsilon[\phi]=\beta_{bend}E_{bend}^\epsilon[\phi]+\beta_{reg}E_{reg}[\phi]+\beta_F E_F^\epsilon[\phi]$, wherein $\beta_{bend}$, $\beta_{reg}$, and $\beta_F$ are a bending energy, a feature energy, and a regularization energy that are each user controlled parameters.

15. An article of manufacture comprising a program storage medium readable by a computer and embodying one or more instructions executable by the computer to perform a method for constructing an optimal parameterization for a discrete surface patch in a computer system, the method comprising:
selecting a three-dimensional image having a surface;
constructing an initial parameterization of the surface onto a two-dimensional plane;
measure a distortion induced by the initial parameterization;
specifying a length parameter $\alpha_l$, an area parameter $\alpha_a$, and an angle parameter $\alpha_c$; and
optimizing the initial parameterization through a discrete deformation of a parameter domain that minimizes the distortion of the parameterized surface based on the length, area, and angle parameters.

16. The article of manufacture of claim 15, wherein the initial parameterization has natural boundary conditions over a constrained boundary.

17. The article of manufacture of claim 15, wherein the initial parameterization comprises a valid parameterization wherein an inverse of the initial parameterization does not allow the surface to fold onto itself.

18. The article of manufacture of claim 15, wherein the distortion comprises $$W(a,d) = \alpha_l a + \alpha_a\left(d + \left(\frac{\alpha_l}{\alpha_a} + 1\right)d^{-1}\right) + \alpha_c(a^2/d - 4),$$

wherein a comprises α length control, d comprises an area control, and $\alpha^2/d-4$ comprises a conformality control.

19. The article of manufacture of claim 15, wherein a user specifies the $\alpha_l$, $\alpha_a$, $\alpha_c$ parameters.

20. The article of manufacture of claim 15, wherein the optimizing comprises iteratively computing a search direction, calculating a step size, and updating the optimal deformation until a minimum distortion has been reached based on the $\alpha_l$, $\alpha_a$, $\alpha_c$ parameters.

21. The article of manufacture of claim 15, the method further comprising:
selecting matching features on two three dimensional surfaces;
evaluating a metric and mean curvature by scan converting a surface triangulation in the parameter domain;
applying a finite element discretization; and
optimizing the discretization using a multiscale approach to minimize an energy of the discretization $E^\epsilon[\phi]$ in accordance with
$E^\epsilon[\phi]=\beta_{bend}E_{bend}^\epsilon[\phi]+\beta_{reg}E_{reg}[\phi]+\beta_F E_F^\epsilon[\phi]$, wherein $\beta_{bend}$, $\beta_{reg}$, and $\beta_F$ are a bending energy, a feature energy, and a regularization energy that are each user controlled parameters.

* * * * *